A. KNISTROM.
MECHANICAL TABULATING MACHINE.
APPLICATION FILED APR. 23, 1919.

1,335,285.

Patented Mar. 30, 1920.
31 SHEETS—SHEET 1.

INVENTOR.
August Knistrom
BY Kerr, Page, Cooper & Hayward
ATTORNEYS.

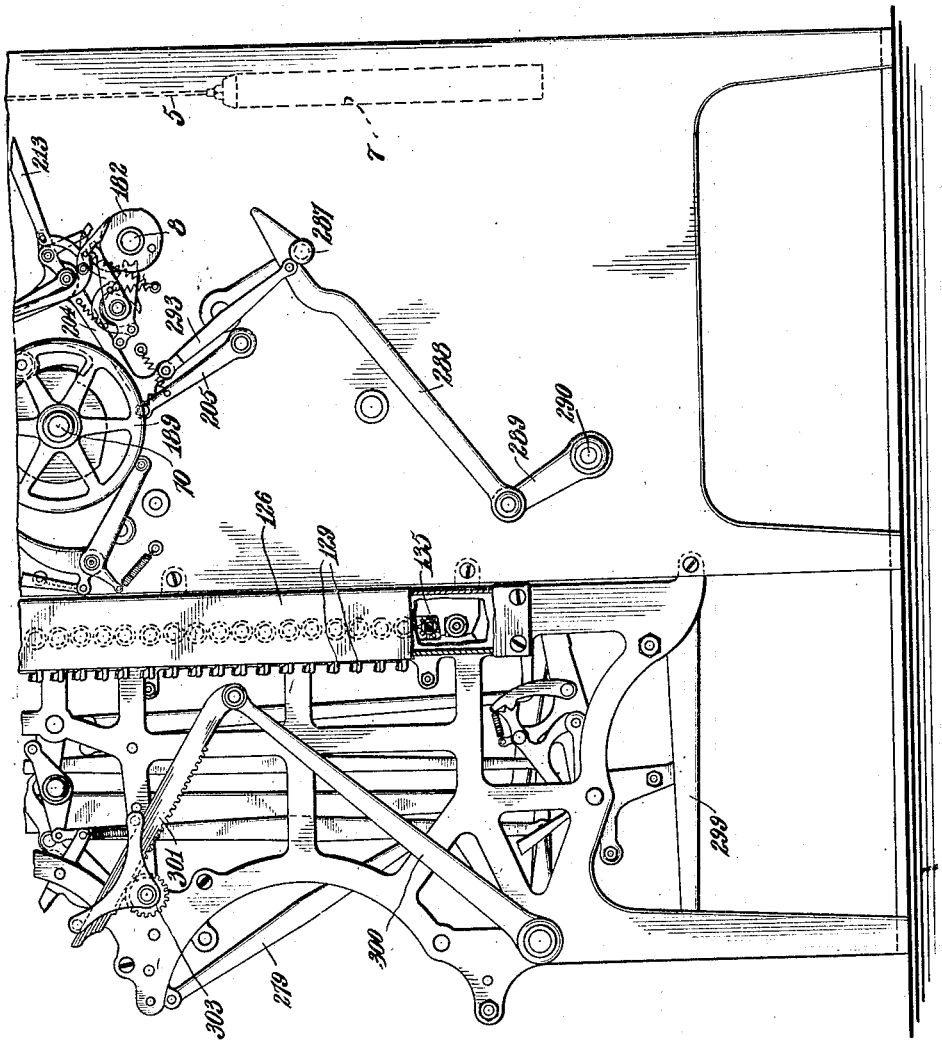

A. KNISTROM.
MECHANICAL TABULATING MACHINE.
APPLICATION FILED APR. 23, 1919.
1,335,285.
Patented Mar. 30, 1920.
31 SHEETS—SHEET 3.
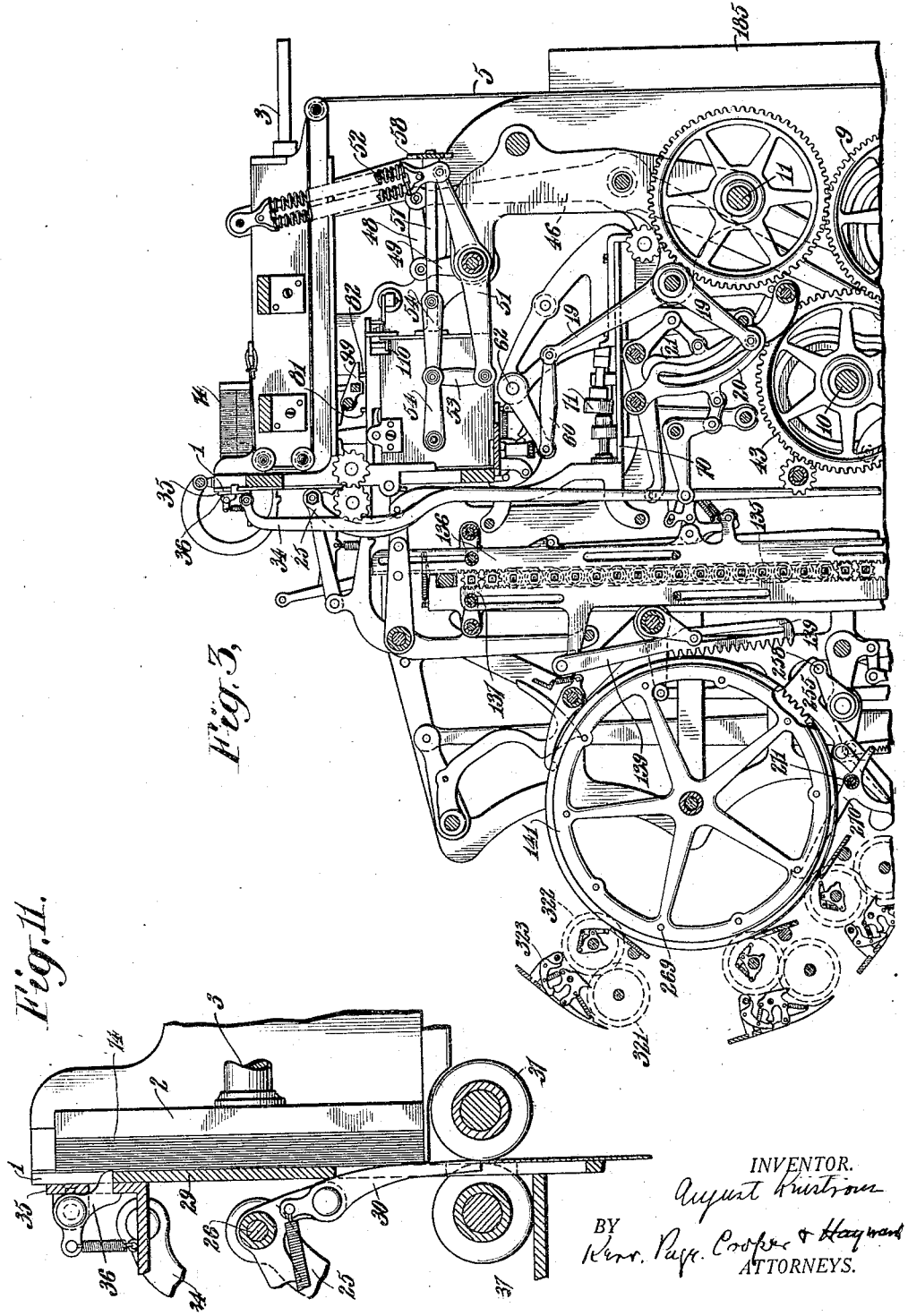

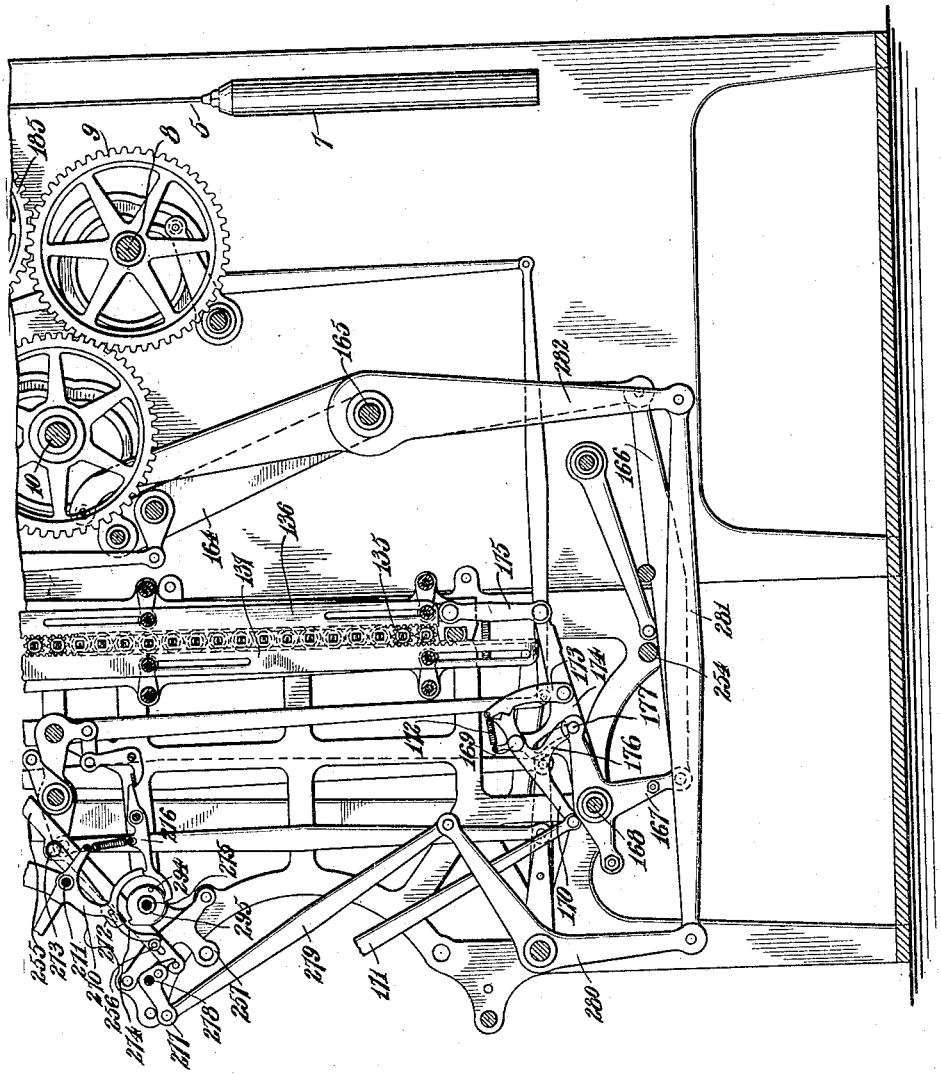

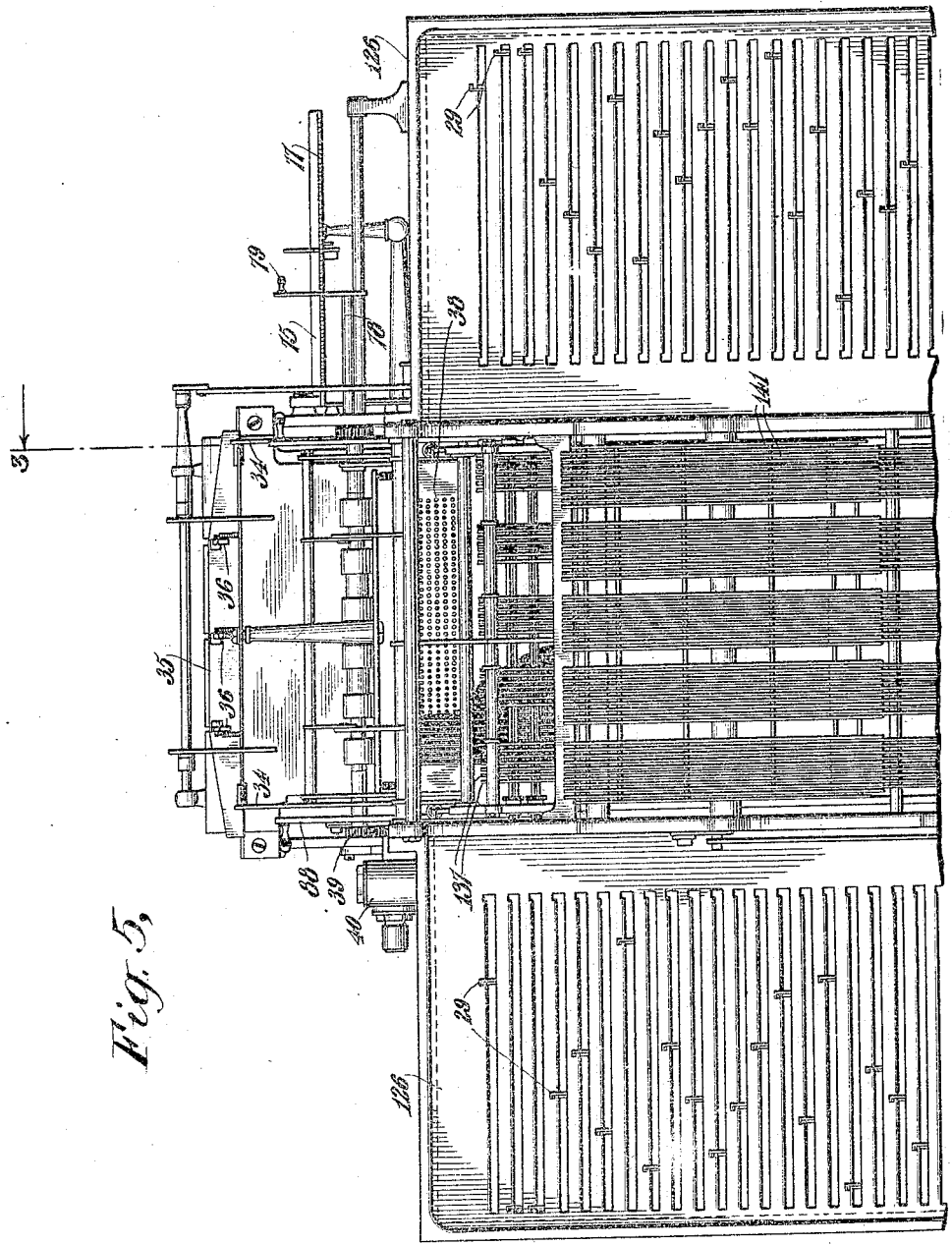

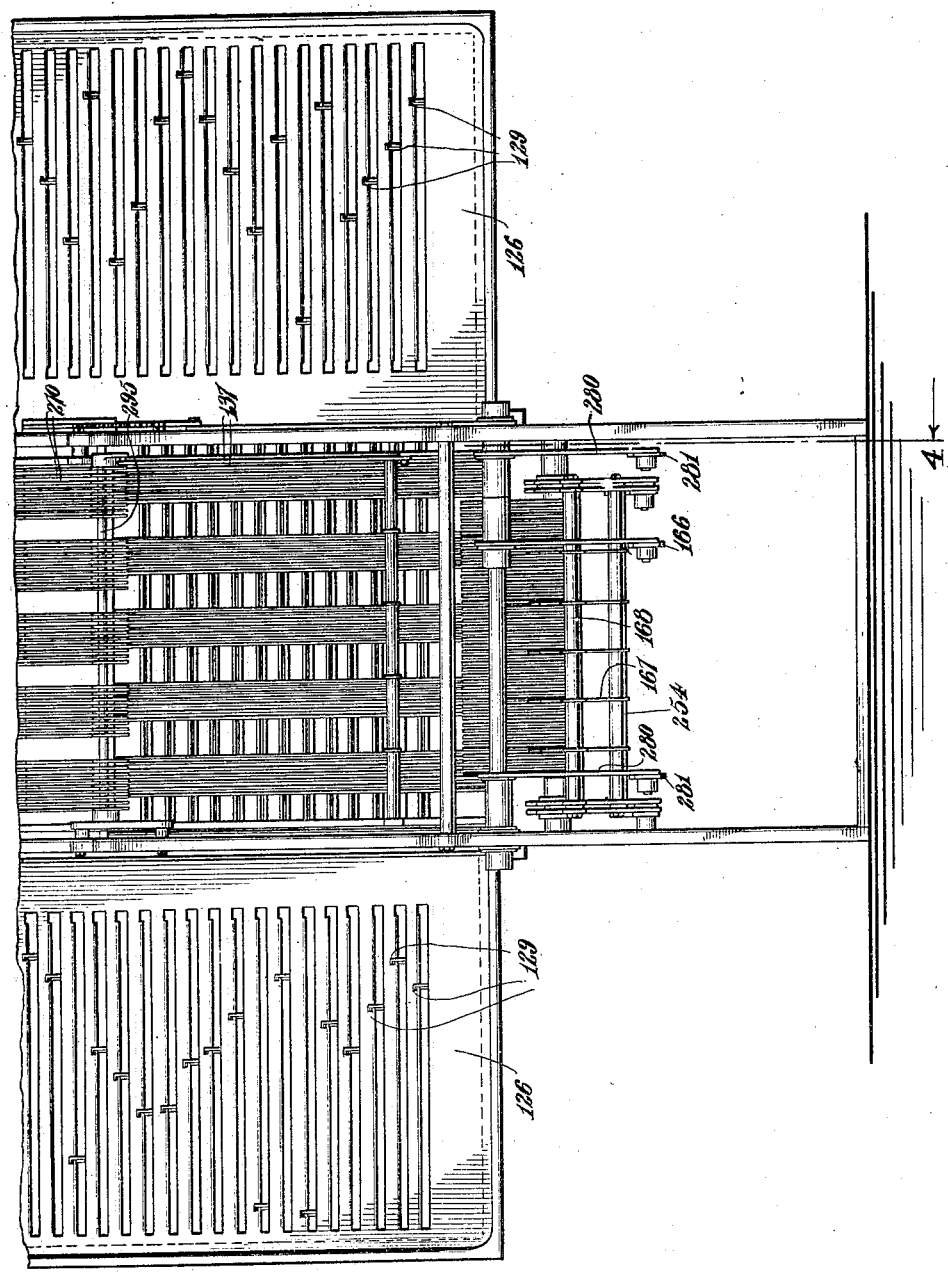

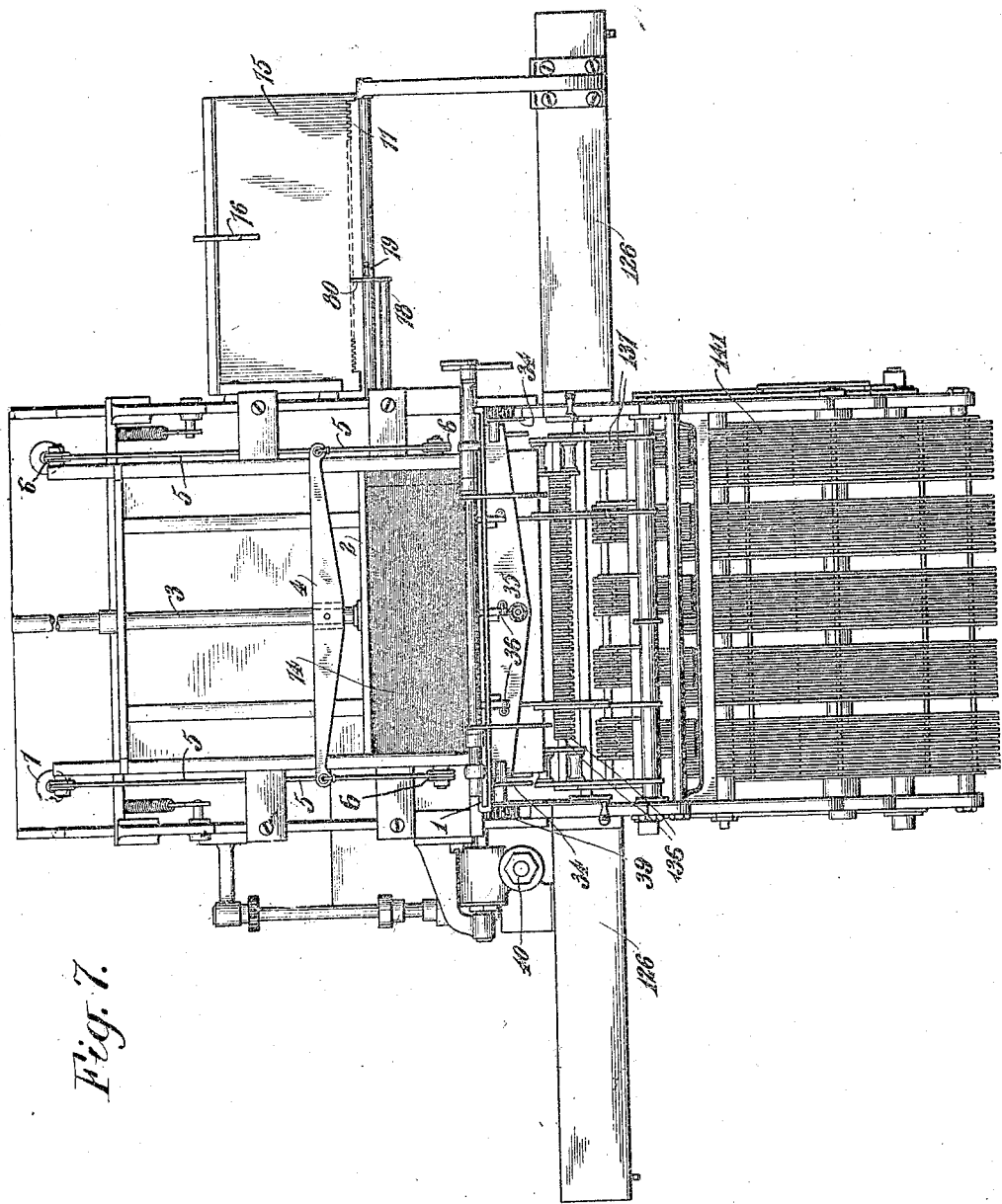

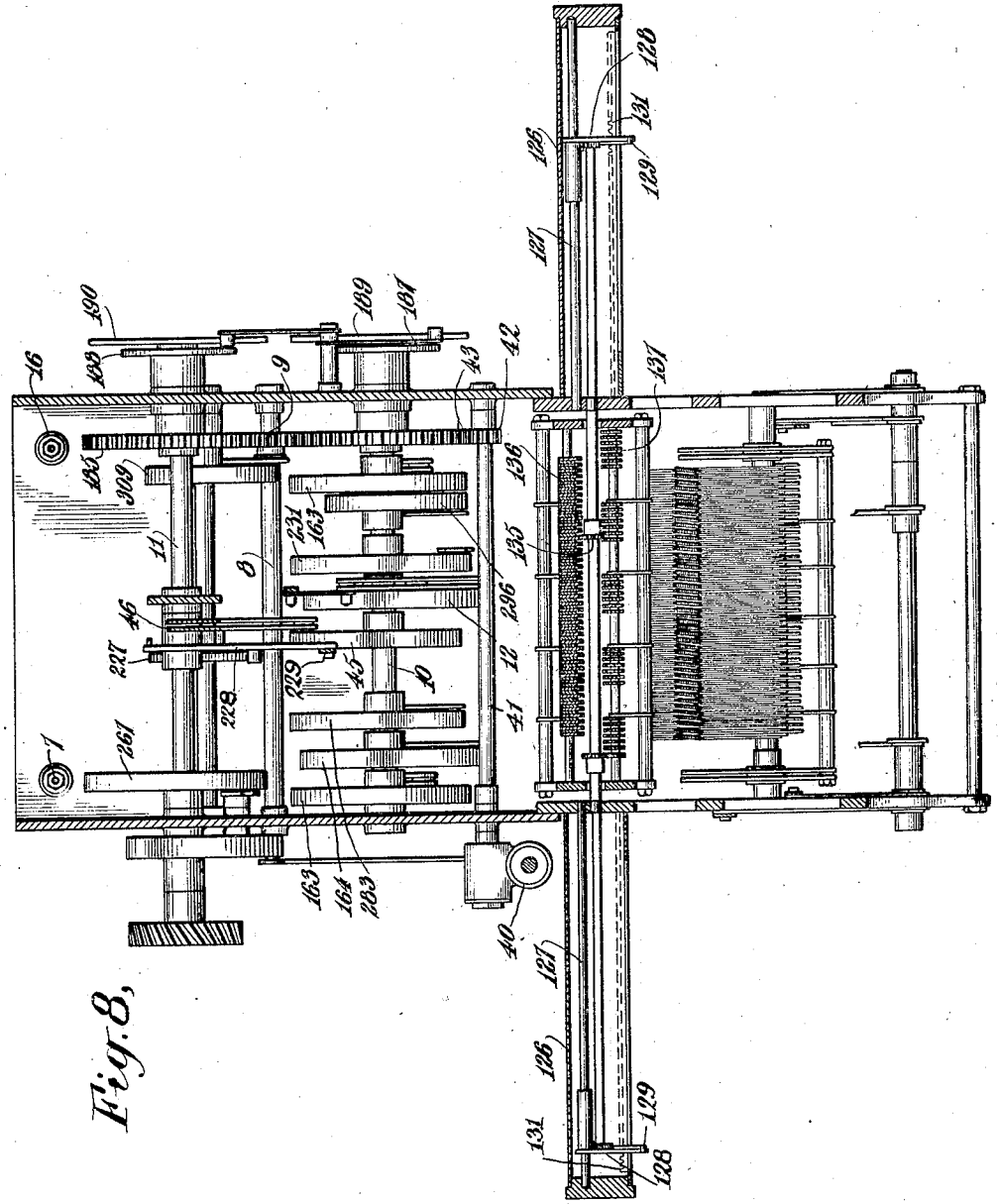

A. KNISTROM.
MECHANICAL TABULATING MACHINE.
APPLICATION FILED APR. 23, 1919.

1,335,285.

Patented Mar. 30, 1920.
31 SHEETS—SHEET 9.

INVENTOR
August Knistrom
BY
Kenn. Page. Cooper + Hayward
ATTORNEY

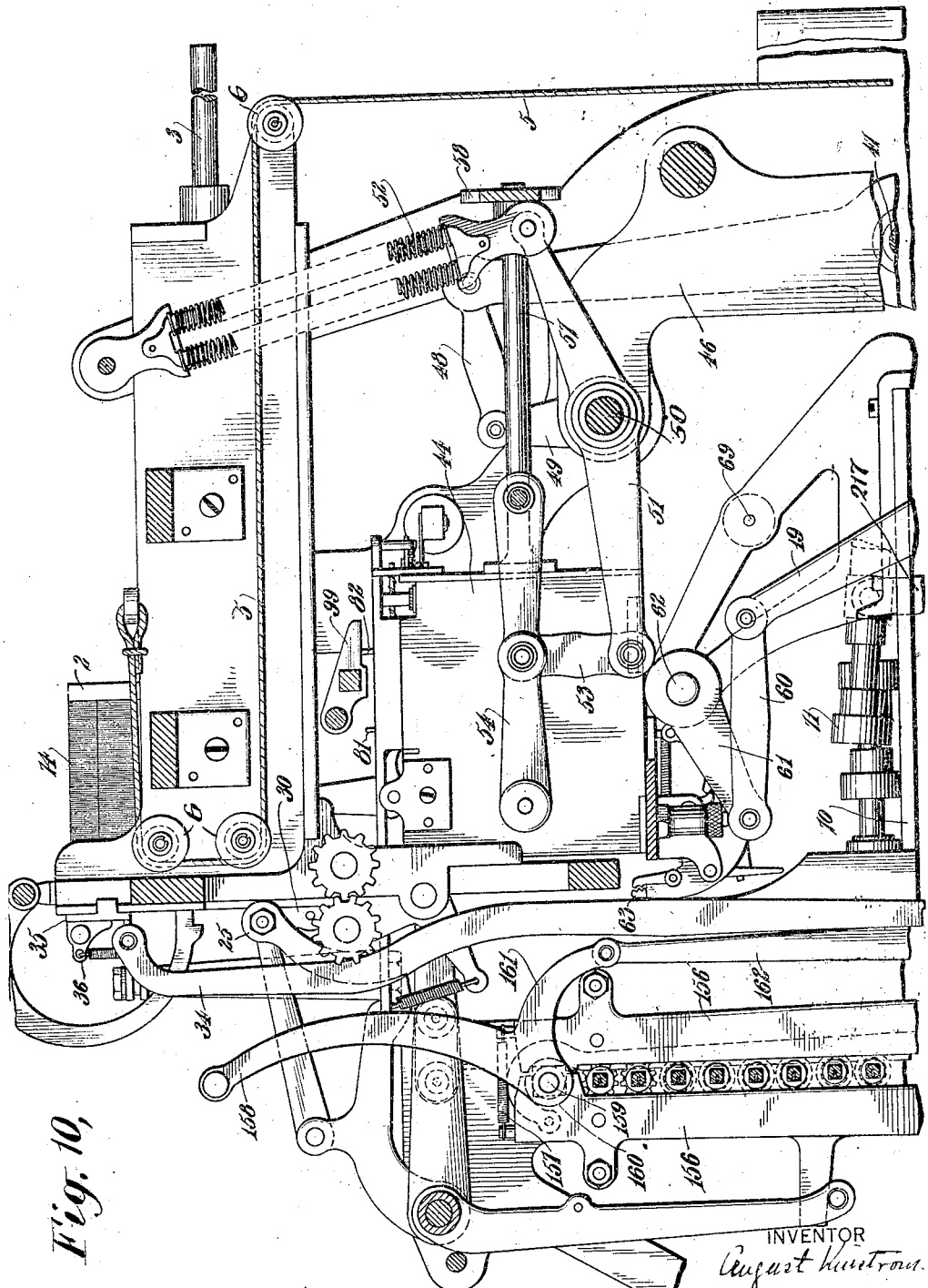

A. KNISTROM.
MECHANICAL TABULATING MACHINE.
APPLICATION FILED APR. 23, 1919.
1,335,285.
Patented Mar. 30, 1920.
31 SHEETS—SHEET 11.
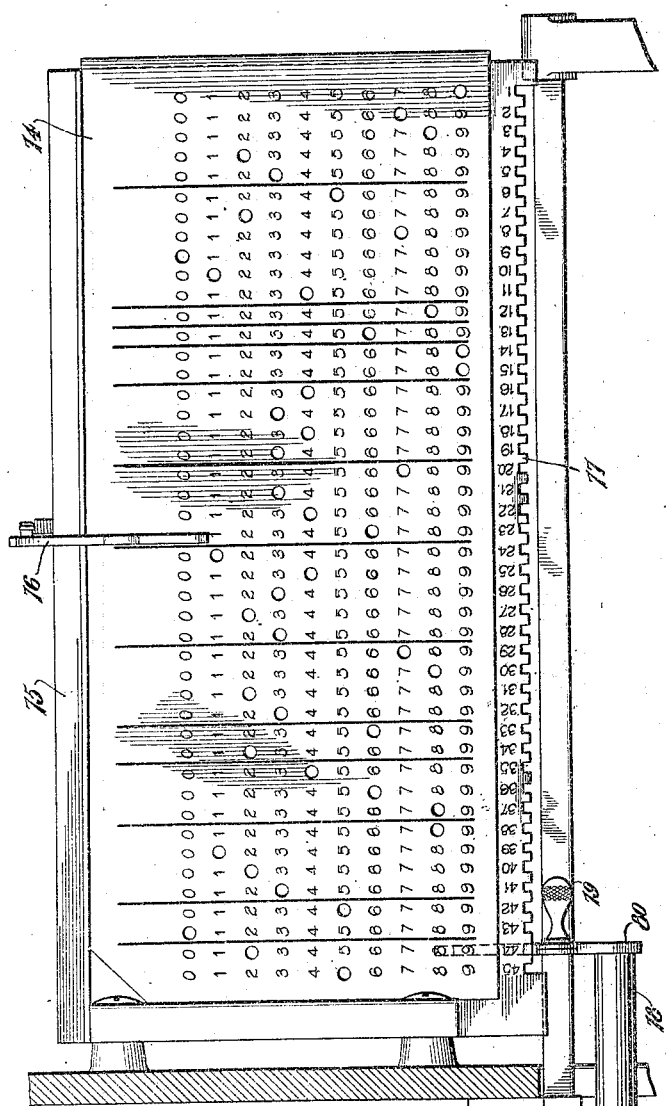
Fig. 13.
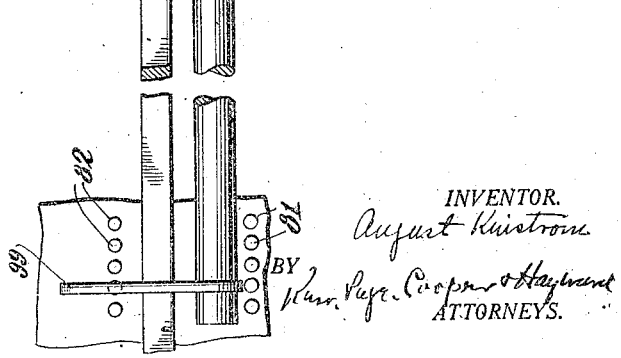
INVENTOR.
August Knistrom
BY
ATTORNEYS.

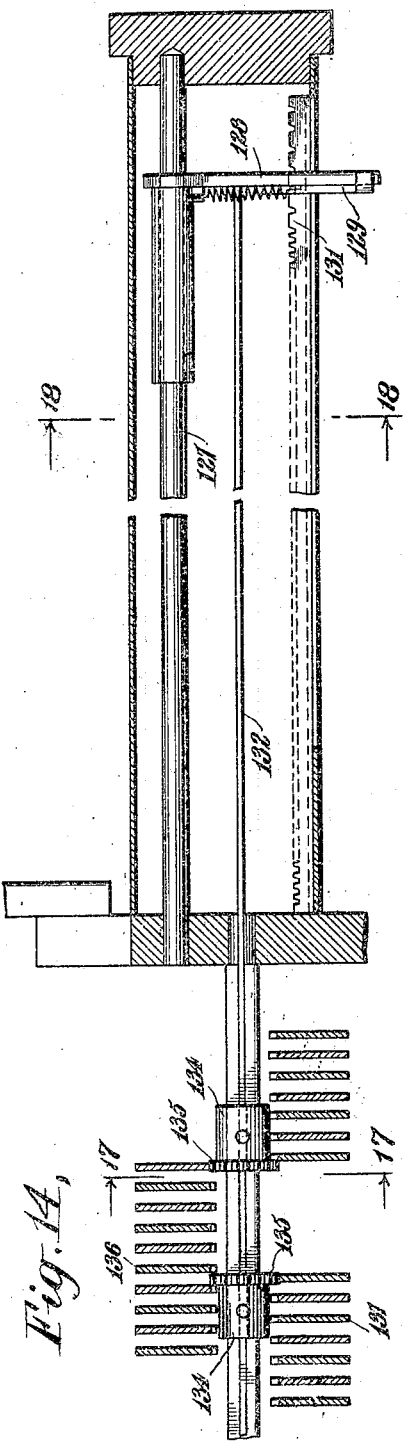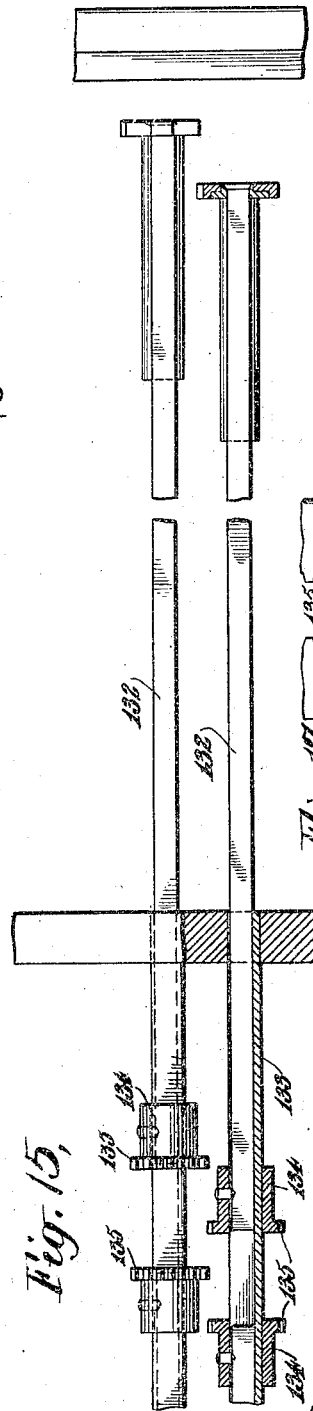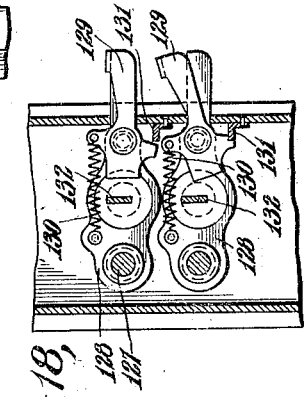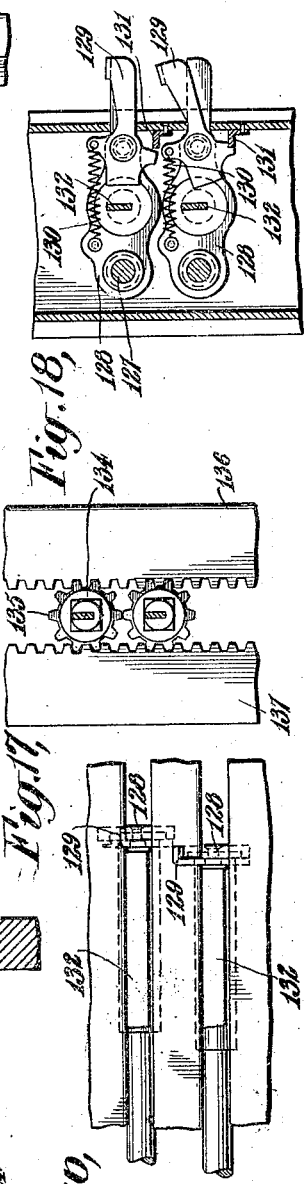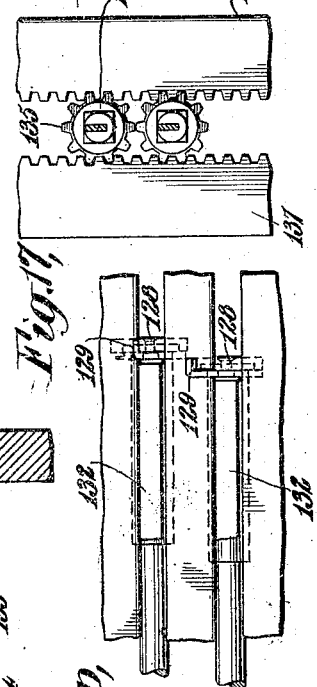

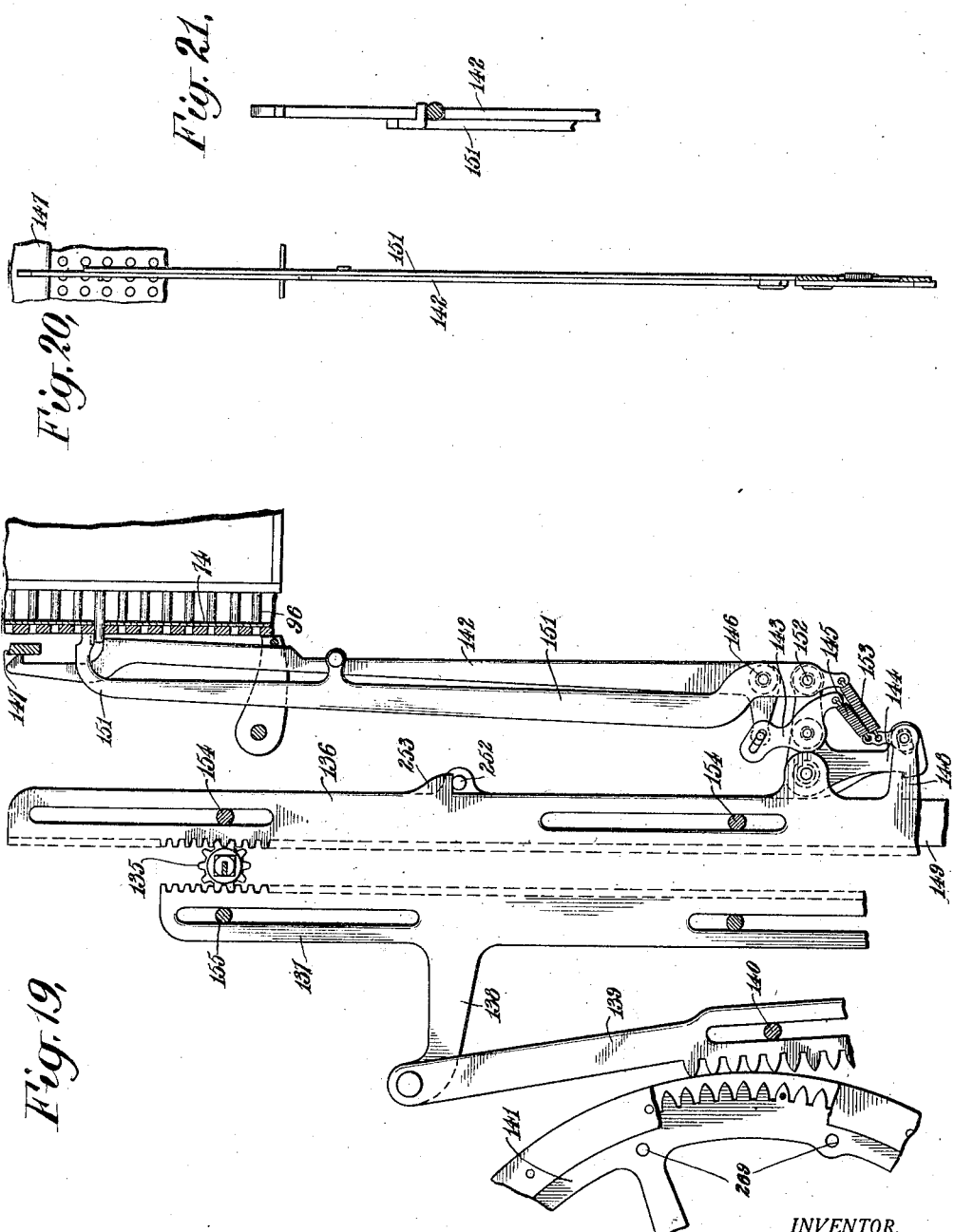

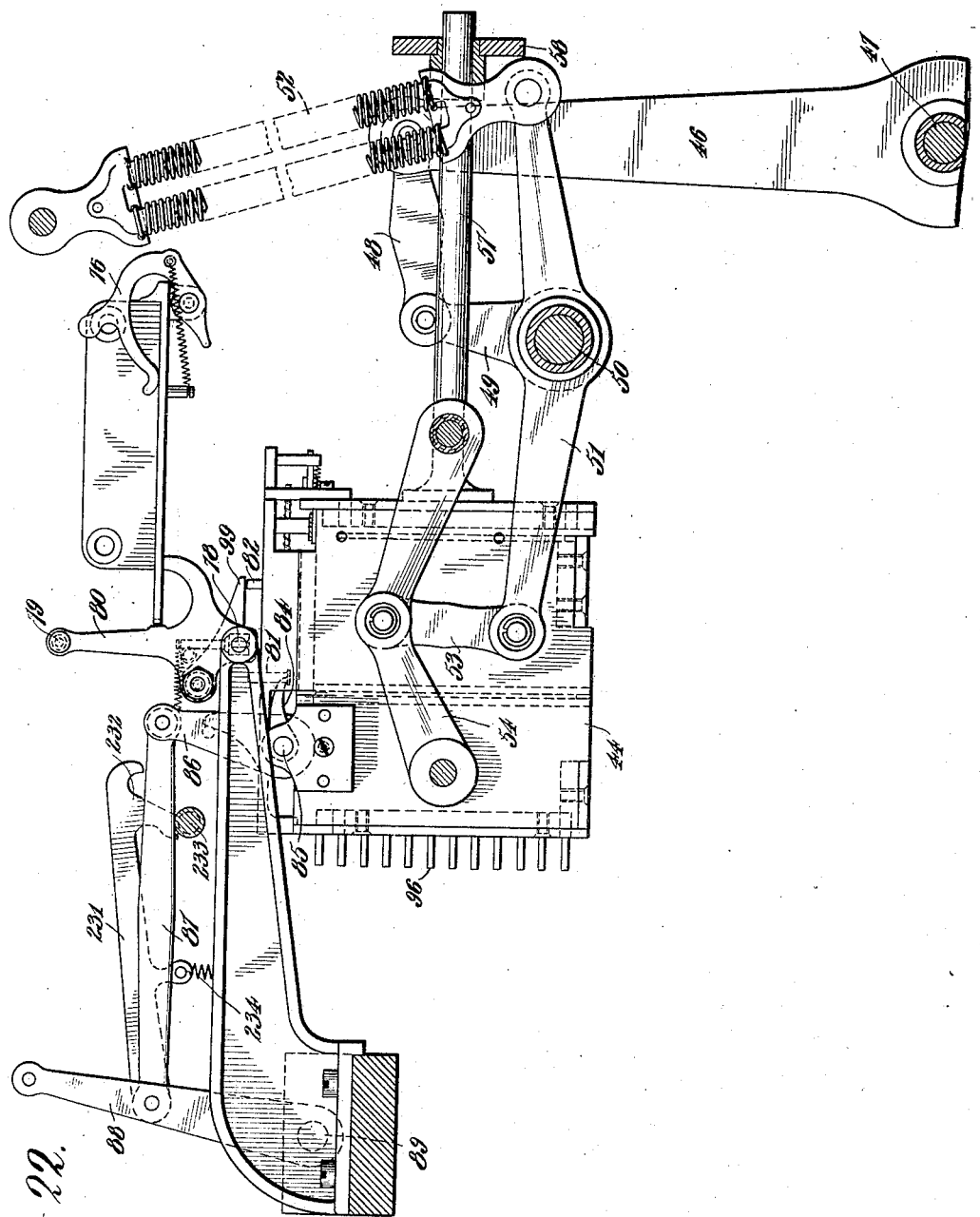

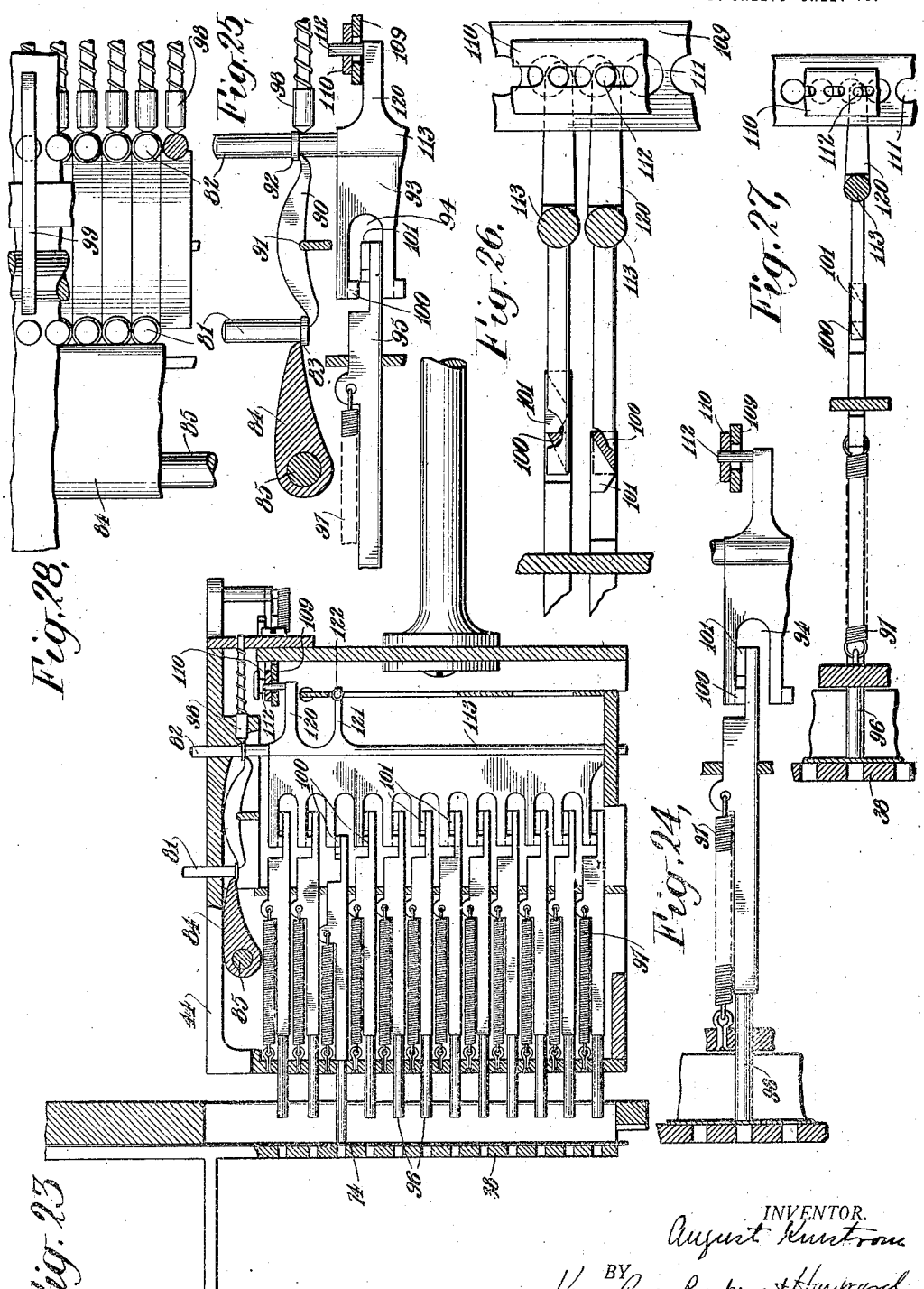

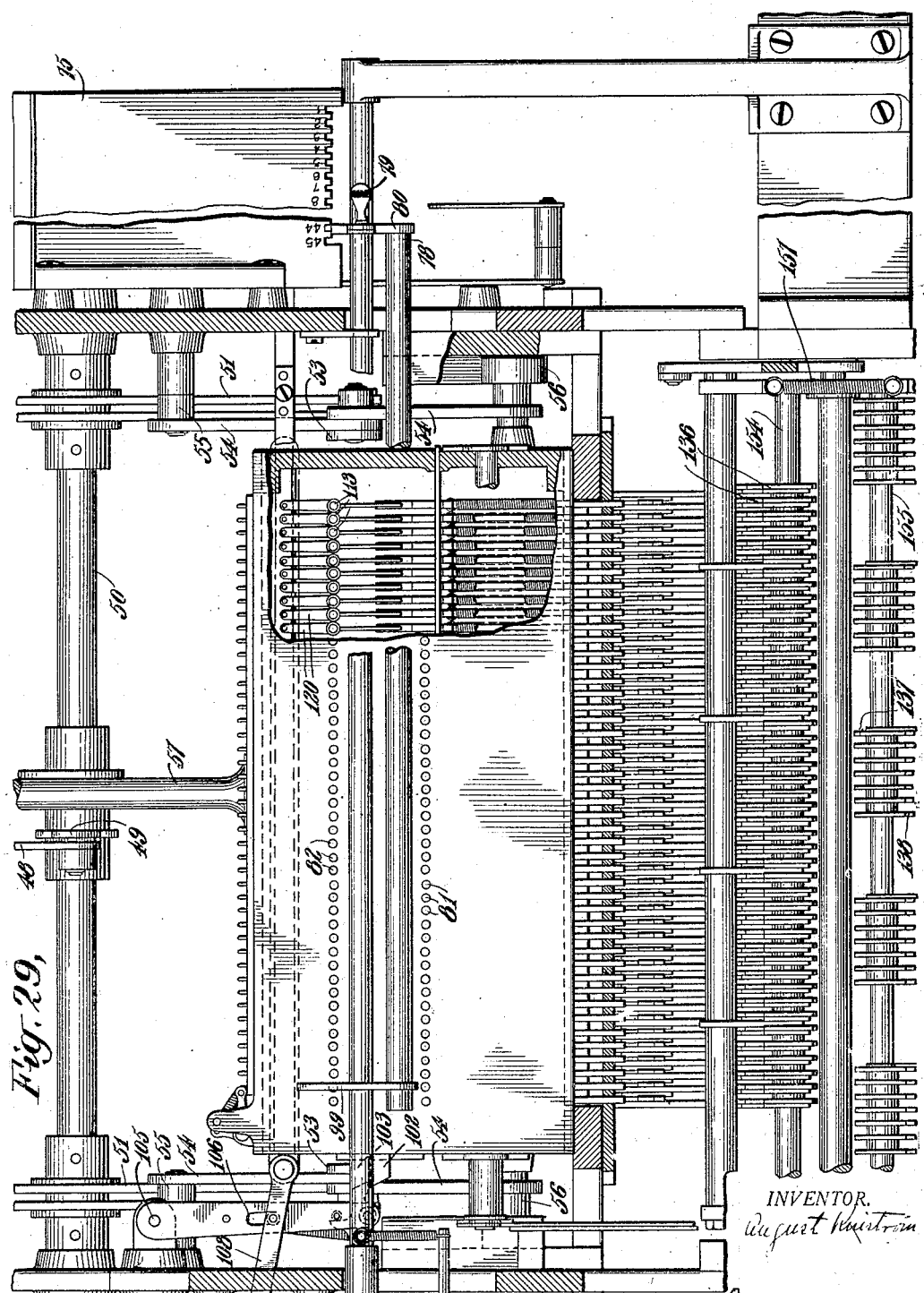

A. KNISTROM.
MECHANICAL TABULATING MACHINE.
APPLICATION FILED APR. 23, 1919.
1,335,285.
Patented Mar. 30, 1920.
31 SHEETS—SHEET 17.
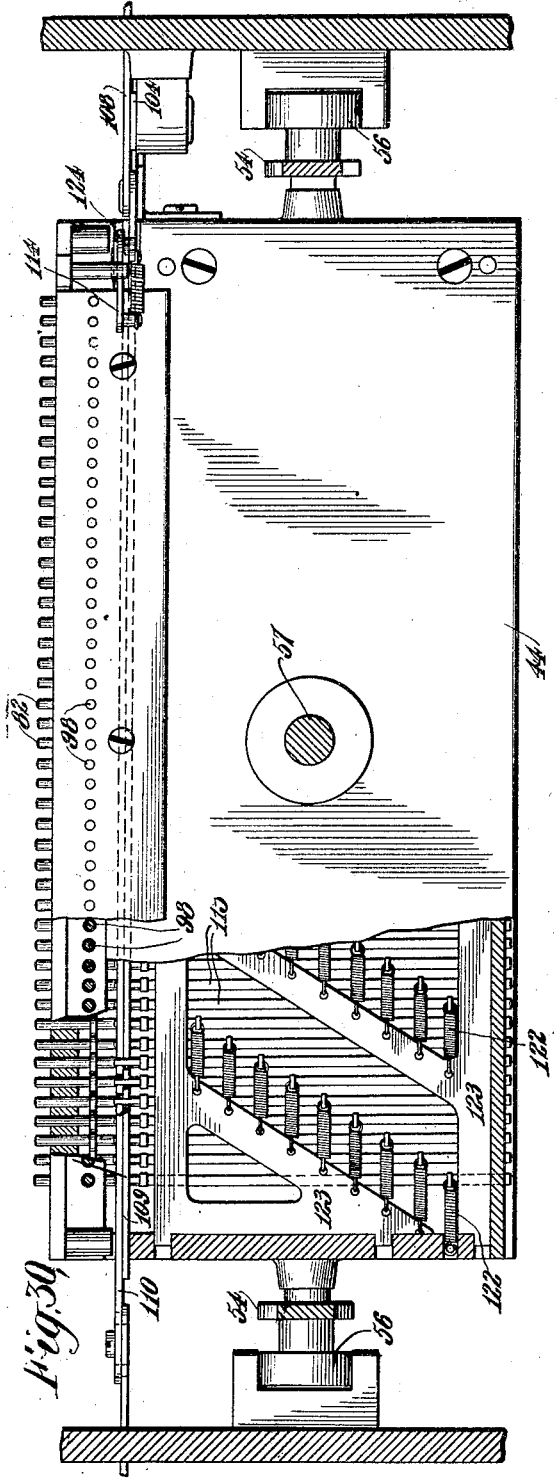
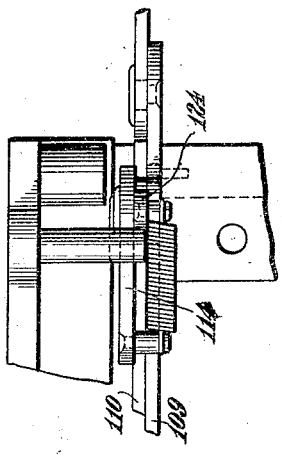
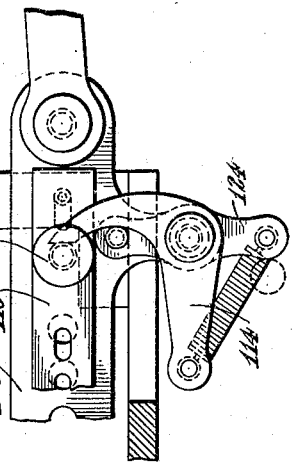
INVENTOR.
August Knistrom
BY
Kerr, Page, Cooper + Hayward
ATTORNEYS.

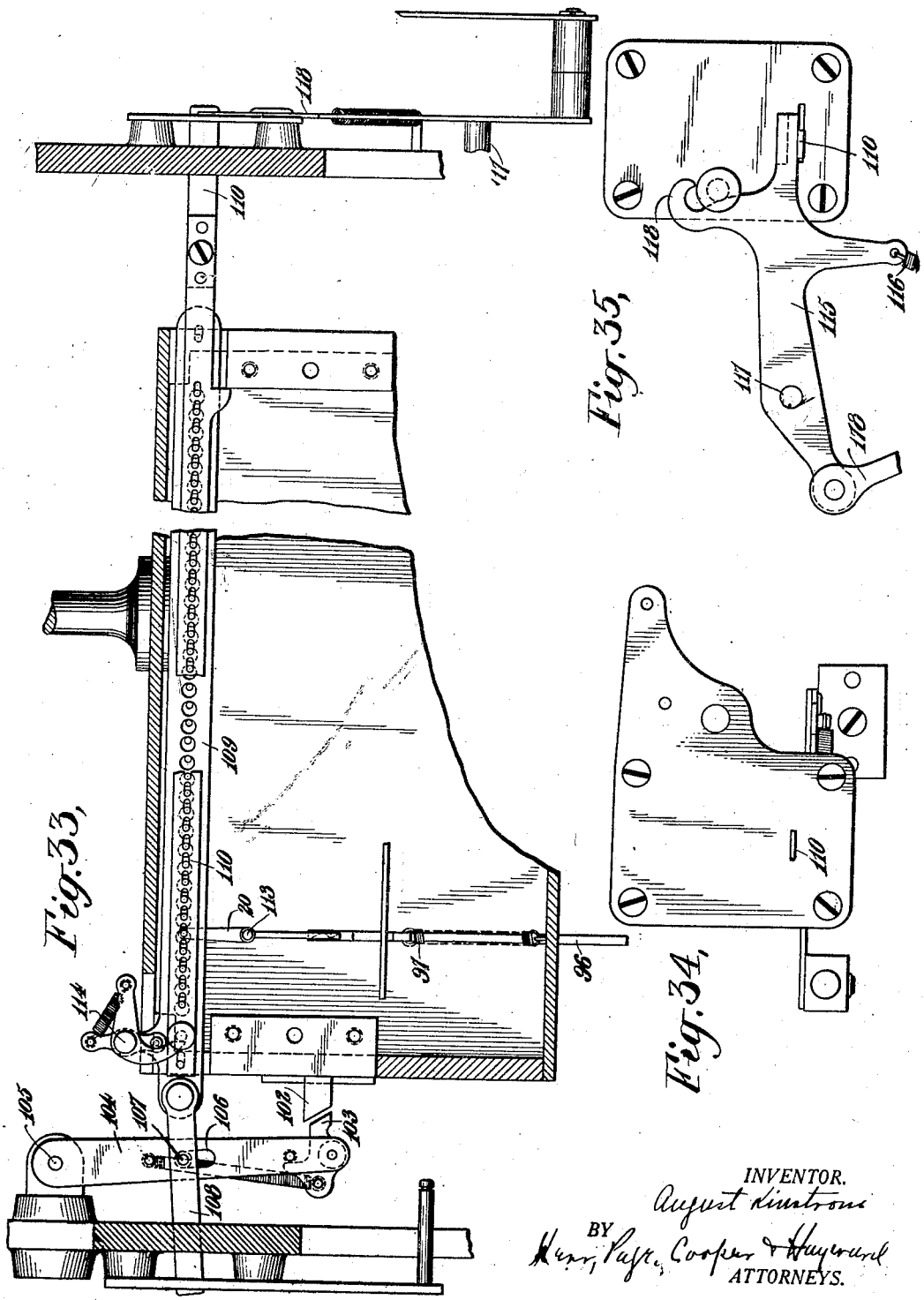

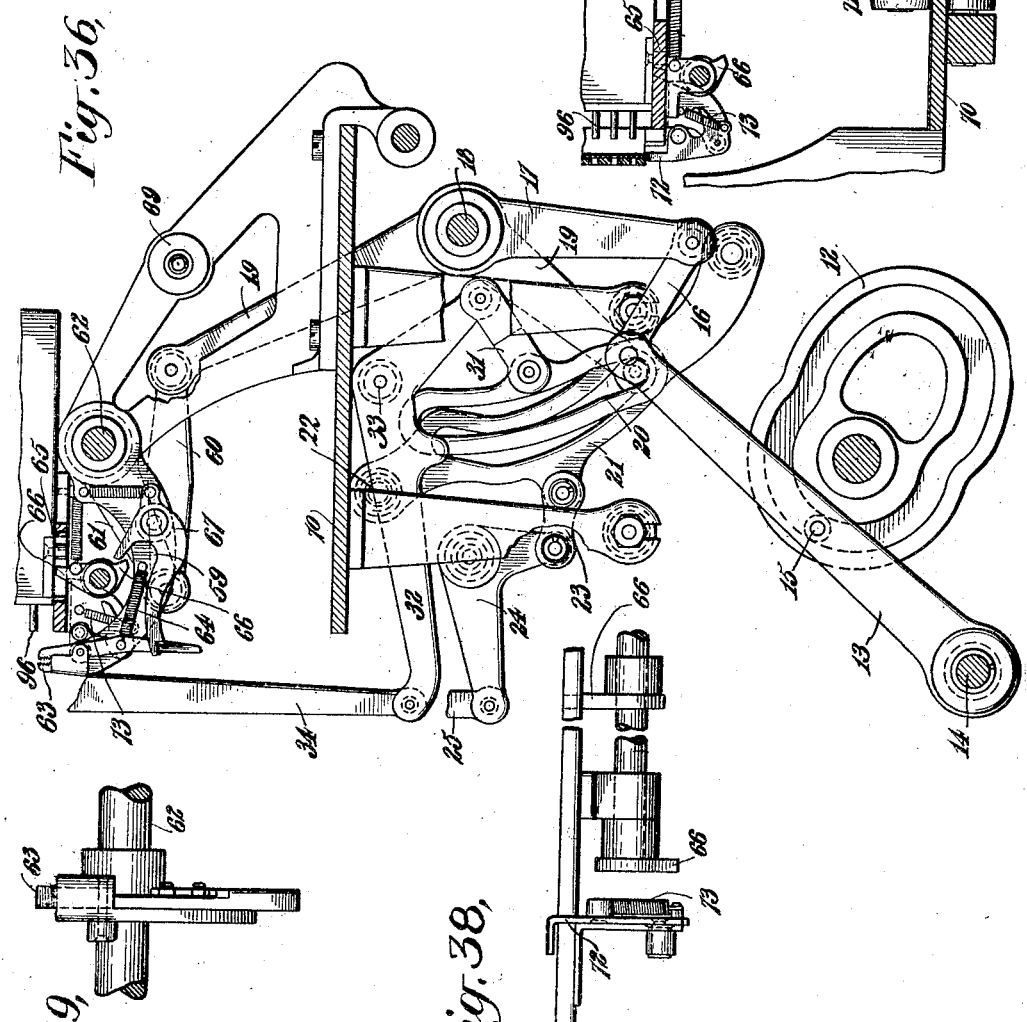

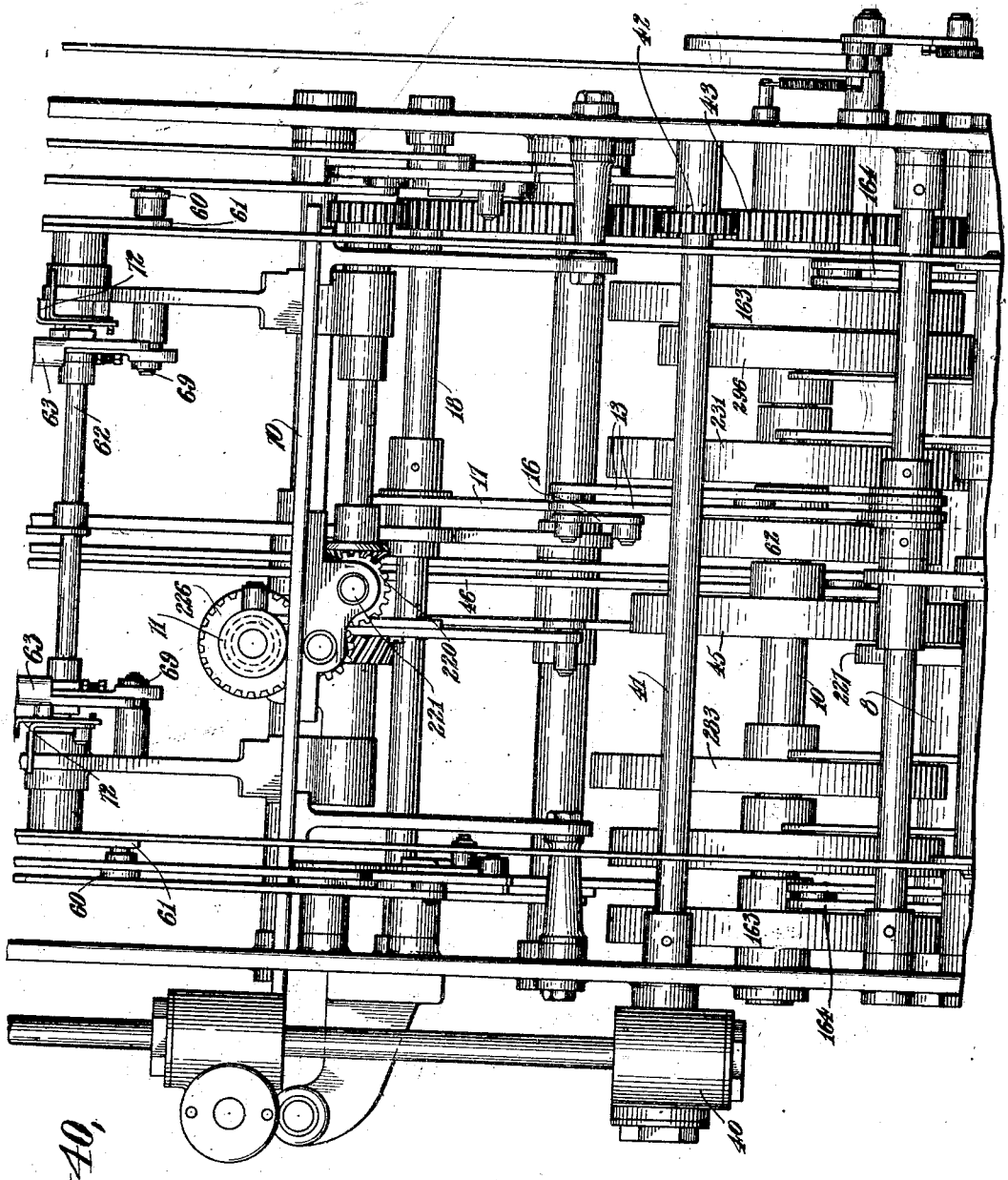

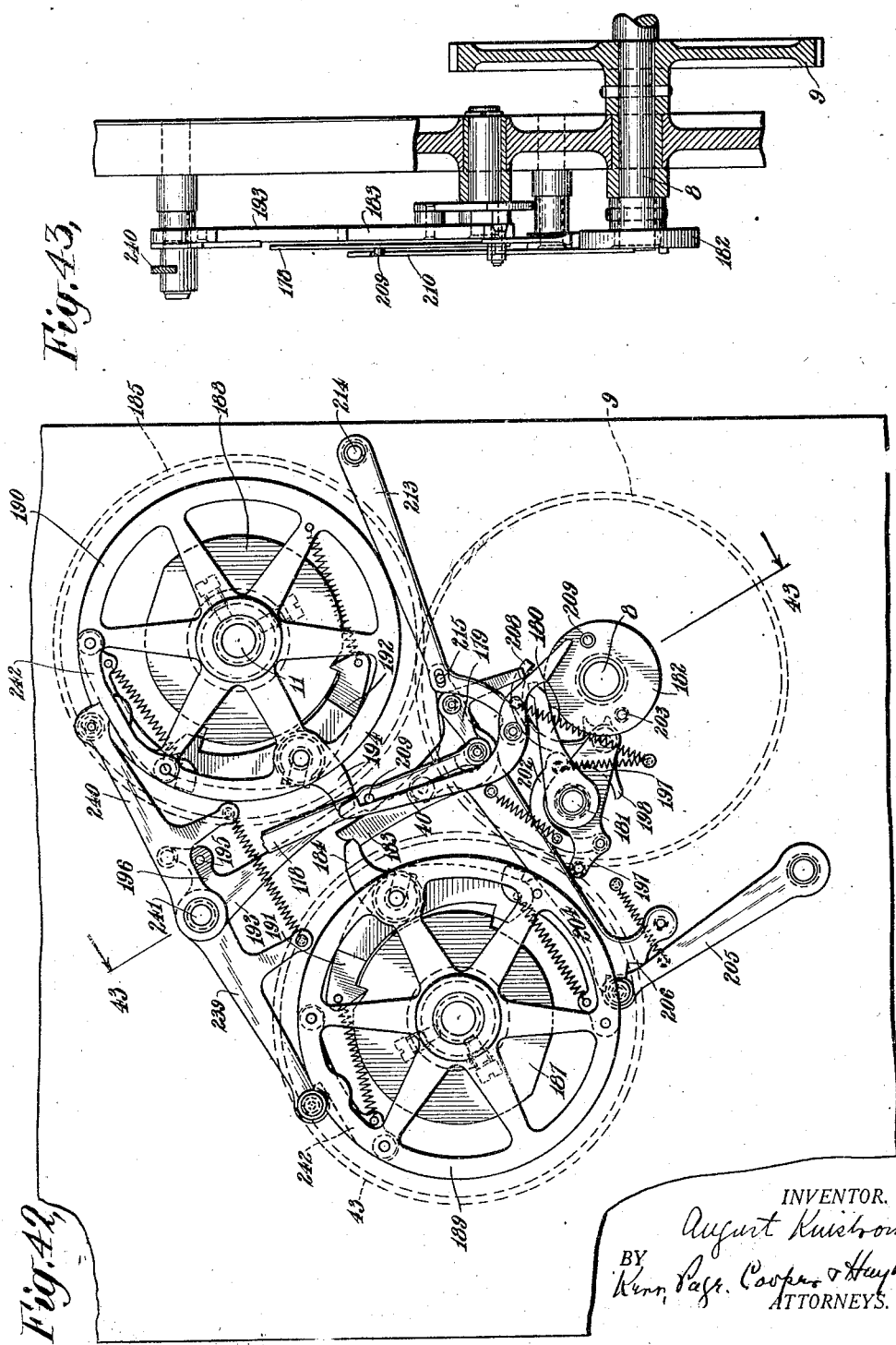

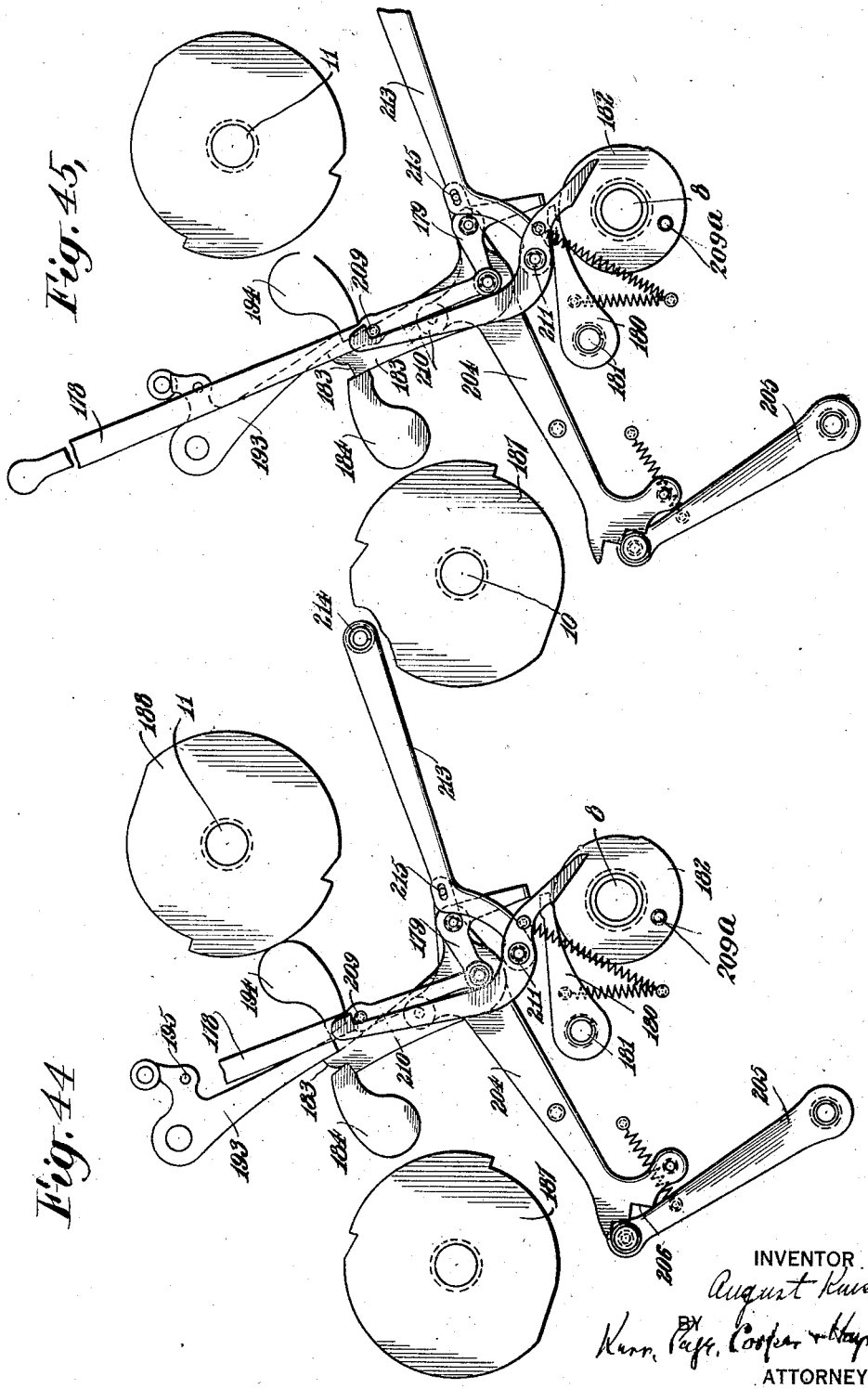

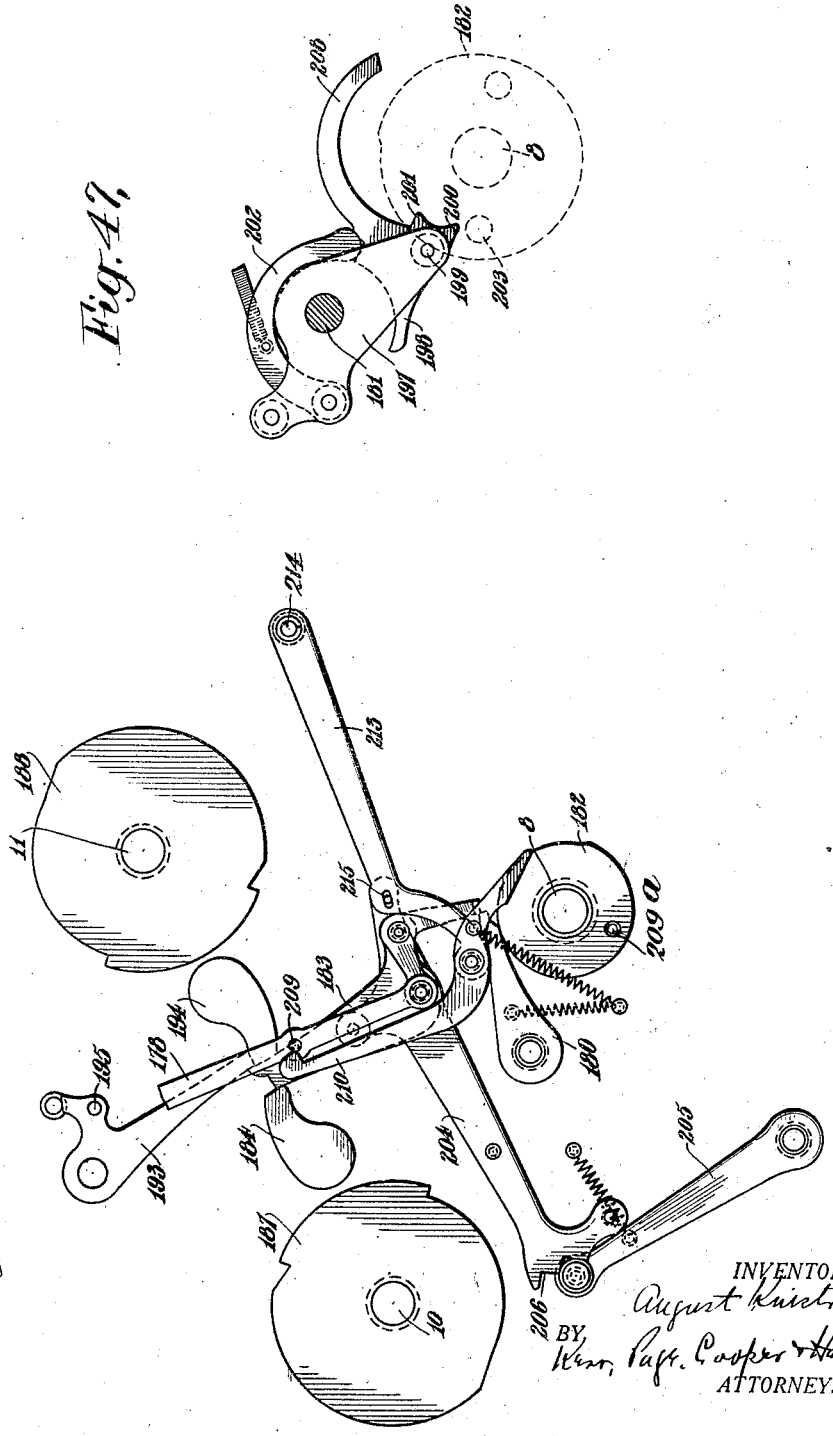

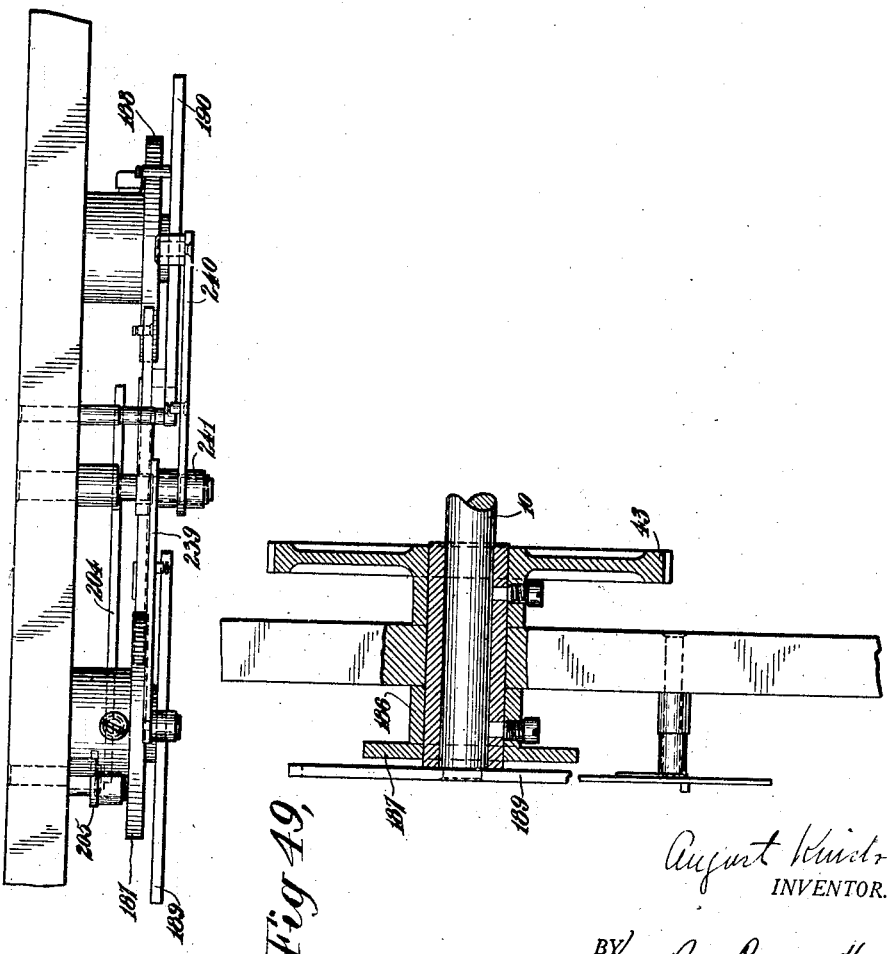

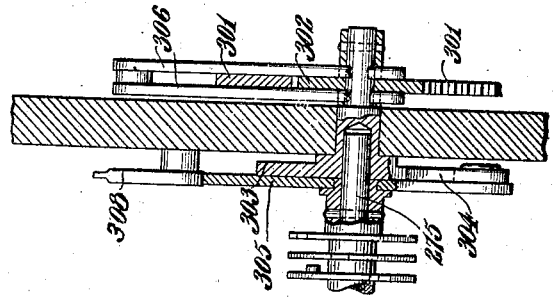
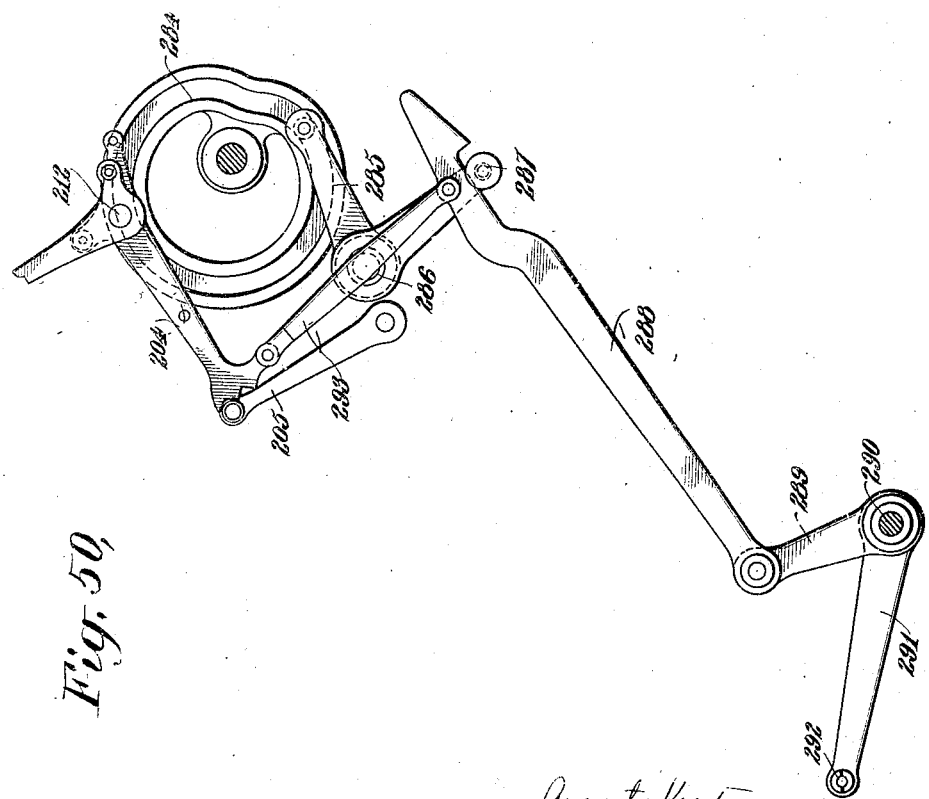

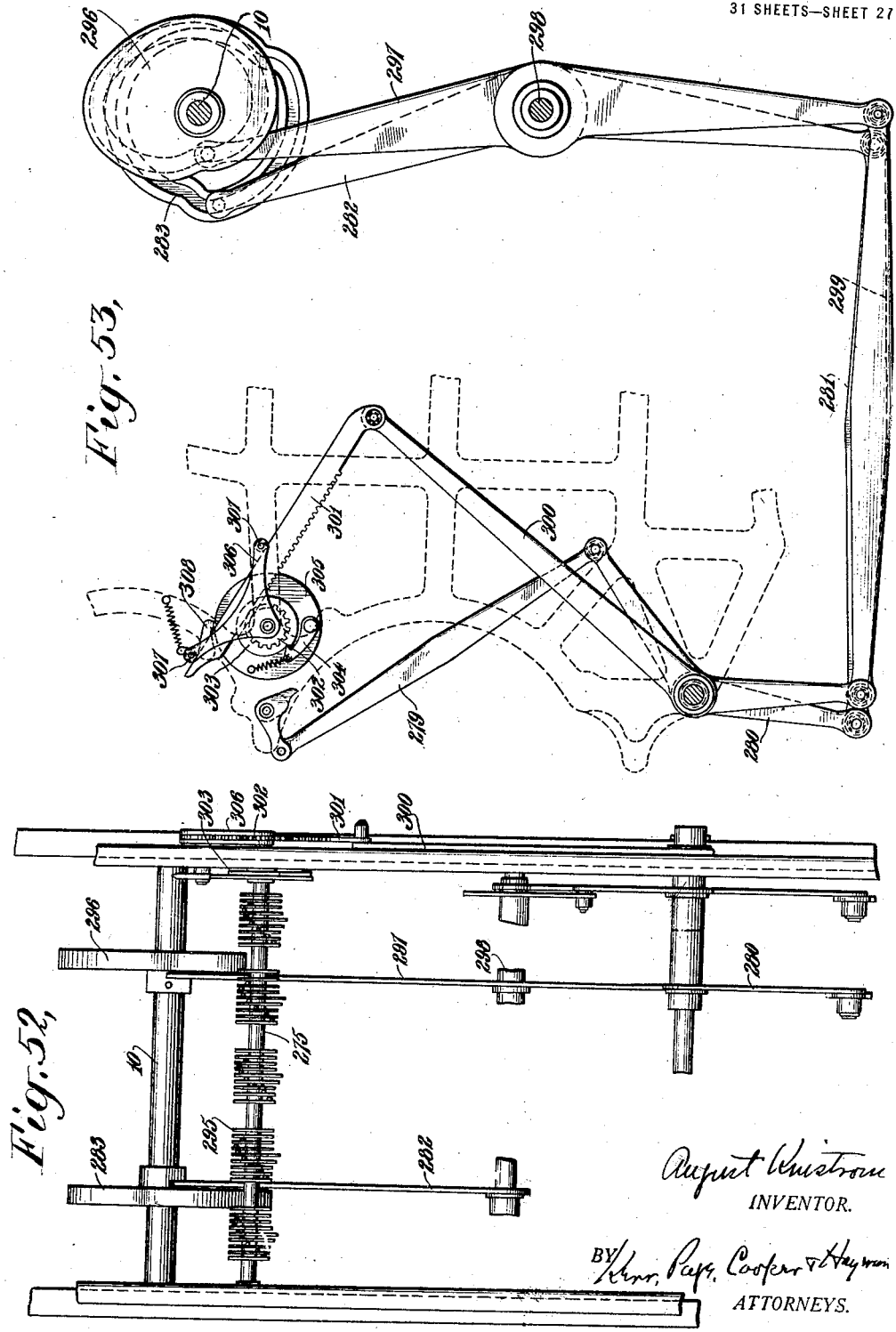

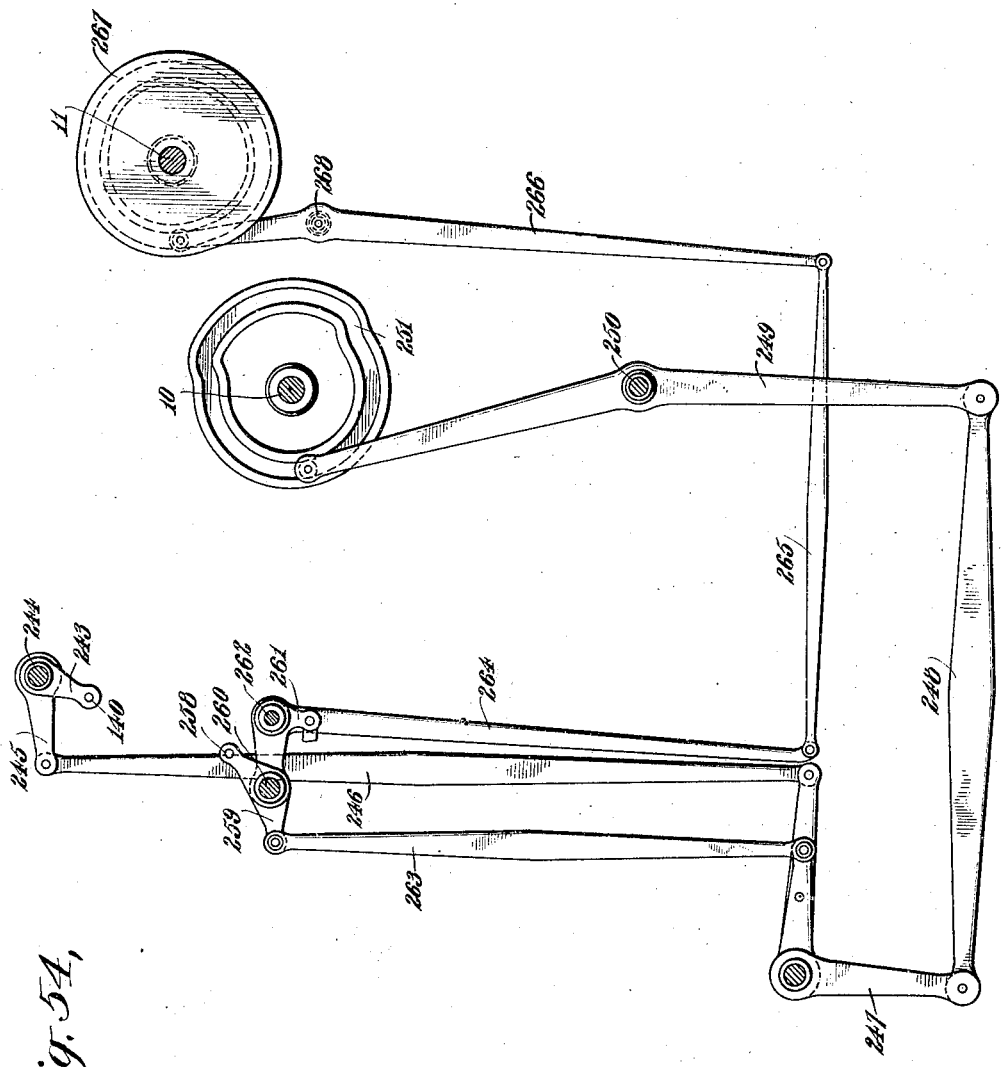

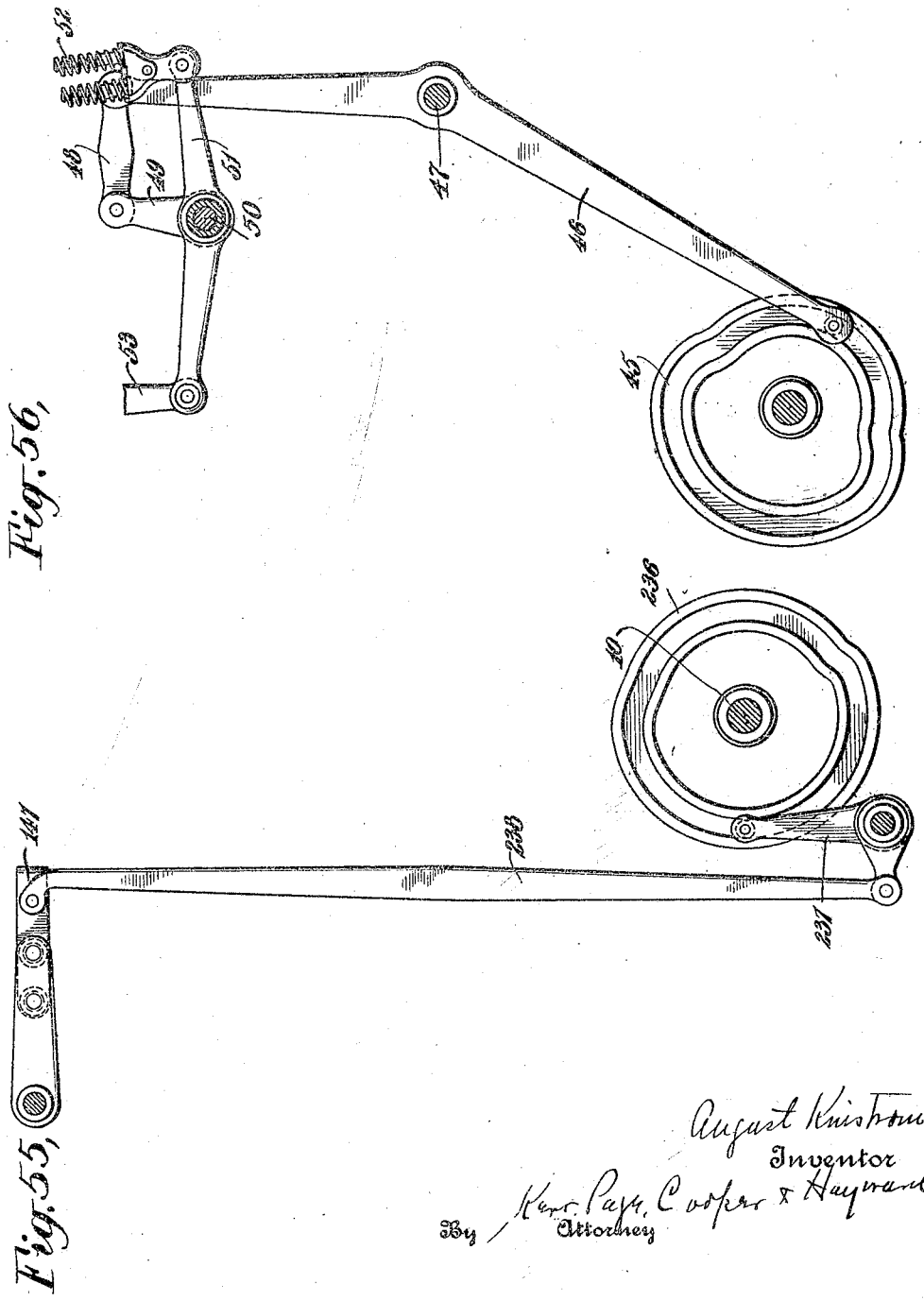

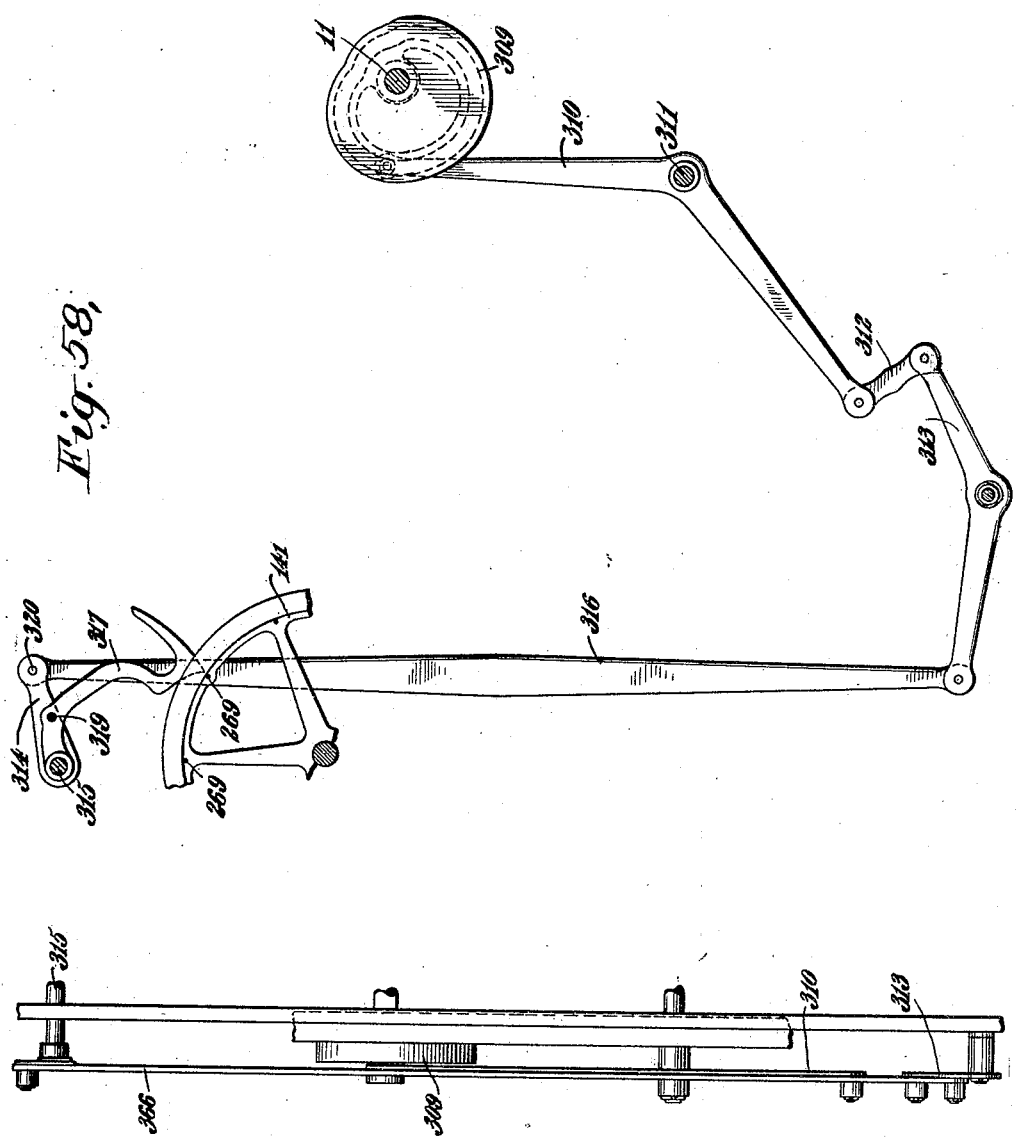

A. KNISTROM.
MECHANICAL TABULATING MACHINE.
APPLICATION FILED APR. 23, 1919.
1,335,285.
Patented Mar. 30, 1920.
31 SHEETS—SHEET 31.
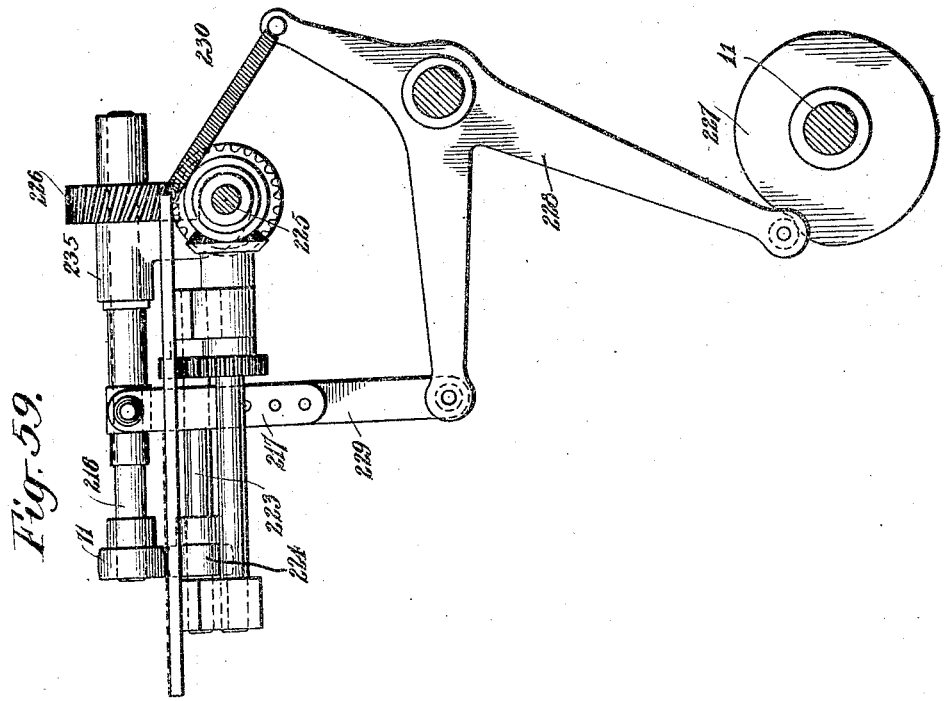
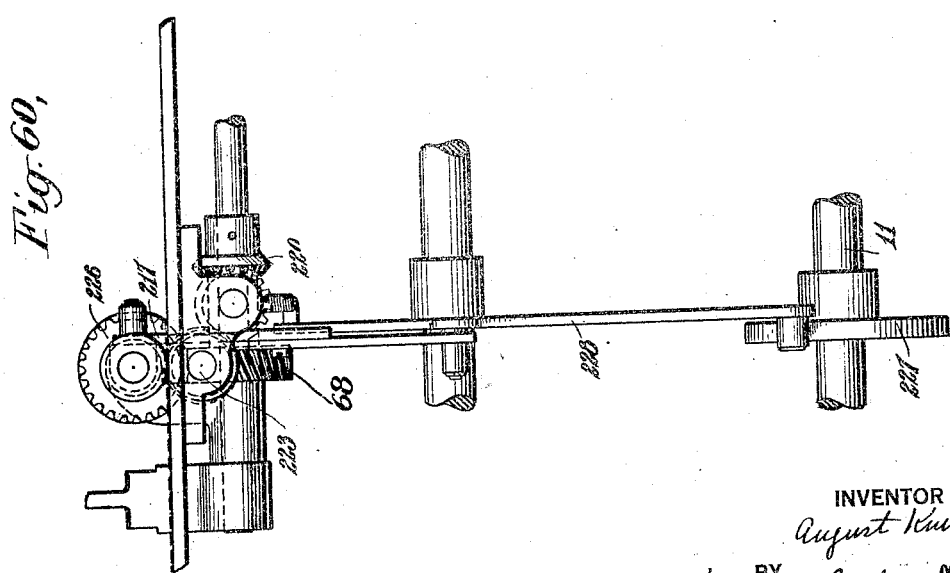
INVENTOR
August Knistrom
BY
Kerr, Page, Cooper & Hayward
ATTORNEY

UNITED STATES PATENT OFFICE.

AUGUST KNISTROM, OF BINGHAMTON, NEW YORK, ASSIGNOR TO THE TABULATING MACHINE COMPANY, A CORPORATION OF NEW JERSEY.

MECHANICAL TABULATING-MACHINE.

1,335,285.      Specification of Letters Patent.      Patented Mar. 30, 1920.

Application filed April 23, 1919. Serial No. 292,228.

*To all whom it may concern:*

Be it known that I, AUGUST KNISTROM, a subject of the King of Sweden, residing at Binghamton, in the county of Broome and State of New York, have invented certain new and useful Improvements in Mechanical Tabulating-Machines, of which the following is a full, clear, and exact description.

The invention which forms the subject of this application for Letters Patent is an improvement in tabulating machines, which, as is now well known, are machines through which a series of cards are run which have holes punched therein that by their number and location indicate dates, job numbers, workman's numbers, money values or other data, according to the purpose for which they are used, and which are provided with means such as a series of pins that are adapted to be moved up to the cards in such manner that those pins which encounter holes in the cards pass through such holes and assume positions which determine the operation of suitable mechanism for recording, printing, or in general tabulating the items or data on a given number of cards.

My object has been to devise such a machine which is purely mechanical in all its parts and operations, or in other words, in which all of the operations demanded of such machines are performed by mechanically operated or controlled parts as distinguished from those whose operation is dependent to a greater or less extent upon electro-magnetic devices, or such as may be controlled by compressed air or the like agency used in place of an electric current. The machine which I have devised is intended to meet the conditions which in practice may frequently arise, which either preclude or render undesirable the use of electricity for controlling the operation of the machine.

Functionally, in a broad sense my improved machine resembles those heretofore in use, but the exigencies of the problem which I have endeavored to solve have required me to devise and use many new forms of mechanism and to modify in many ways in form and operation those parts which in carrying out my invention I have appropriated from the prior art. For an understanding of the invention, therefore, no general statement of the nature of these improvements will be of any substantial value, and I may therefore describe the same best by a detail description of the apparatus prefaced by a brief and very general statement of its nature or purpose.

I have constructed and shall describe herein the main portion of a complete tabulating machine through which any number of properly punched cards may be passed, the number and the location of the holes in which operate mechanism capable of being set or adjusted according to the requirements of the machine, to control the operation of mechanism for tabulating any items indicated by such holes and for printing the record on any part of a card or sheet that may be desired. Aside from this general purpose I have provided many accessory devices for stopping the machine when cards are passed which are not desired, for totalizing at such or at any other times, and for performing all of the operations required from machines of this general class.

The construction of my improved tabulating machine is fully illustrated in the accompanying drawings, and the mode of operation of the same will be explained by the subjoined description and references to the said drawings.

Fig. 2 is a similar view of the lower part of the machine.

Fig. 3 is a view in elevation of the upper working parts of the machine as viewed from the left, the side plate of the machine being removed. This view is taken on line 3—3 of Fig. 5.

Fig. 4 is a similar view on the same line of the lower portion of the machine.

Fig. 5 is a front view in elevation of the upper portion of the machine.

Fig. 6 is a similar view of the lower portion of the same.

Fig. 7 is a top plan view of the device.

Fig. 8 is a horizontal section taken practically on a plane just above the central horizontal line of Fig. 3.

Fig. 10 is a section looking to the left on line 10—10 of Fig. 9.

Fig. 11 is a vertical section on line 11—11 of Fig. 9, of the card holder and means for feeding the cards.

Fig. 13 is a top plan view of a card receiver and associated parts.

Fig. 14 is a detail of certain rack bars and the means for connecting any one of the same with any type wheel controlling bar.

Fig. 15 is a view taken at right angles to Fig. 14 of the same parts.

Fig. 16 is a detail view of the parts shown in Fig. 18, but at right angles to the plane of that figure.

Fig. 17 is a sectional view on the line 17—17 of Fig. 14.

Fig. 18 is a sectional view on the line 18—18 of Fig. 14.

Fig. 19 is a view in elevation and part section of the rack bars, mechanism controlled thereby and intermediate connections.

Fig. 20 is an edge view or elevation of the parts shown in Fig. 19, and looking to the left.

Fig. 21 is another view of a portion of the parts shown in Fig. 20.

Fig. 22 is a detail of means for setting and clearing the pin box mechanism.

Fig. 23 is a sectional view of the pin box complete.

Fig. 24 is a detail of a finder pin and the member controlled thereby.

Fig. 25 is a detail of means used for setting up the pins in the pin box.

Fig. 26 is a top view of parts of the mechanism shown in Fig. 25.

Fig. 27 is a top view of one complete finder pin and its controlling devices.

Fig. 28 is a top view of the clearing and setting up mechanism.

Fig. 29 is a top view of the entire pin box and rack bar mechanism.

Fig. 30 is a part sectional view of the rear of the pin box.

Fig. 31 is a detail of mechanism for returning a sliding member controlled by the pin box.

Fig. 32 is a view looking from the right of the same mechanism.

Fig. 33 is a plan view of certain controlling bars and means for operating one of them by the pin box.

Fig. 34 is a view in elevation of the side plate of the machine on one side.

Fig. 35 is a similar view of the plate on the opposite side.

Fig. 36 is a view in elevation of mechanism for gripping and manipulating the cards.

Fig. 37 is another view of the same parts showing them in different positions.

Fig. 38 is a detail of parts of Fig. 36.

Fig. 39 is a detailed view of the means for gripping the cards.

Fig. 40 is a view in elevation of a card feed shaft and parts connected therewith.

Fig. 42 is a view in elevation of the means for stopping and starting the machine.

Fig. 43 is a section of mechanism shown in Fig. 42, on the line 43—43 of Fig. 2.

Figs. 44, 45, 46 and 47 are details of the stopping and starting mechanism of Fig. 42.

Fig. 48 is an edge view of the parts shown in Fig. 42.

Fig. 49 is a sectional view through one of the shafts of Fig. 48.

Fig. 50 is a detail of means for restoring the racks to zero position.

Fig. 51 is a sectional view of the parts shown in Fig. 53, the same being means for operating what is termed the adding helix.

Fig. 52 is a front view of the said adding helix which operates the type wheel controlling mechanism.

Fig. 53 is a detail of the cam and connections for operating the adding helix and transfer or carrying mechanism.

Fig. 54 is a detail of mechanism for controlling the adding and accumulating racks.

Fig. 55 is a detail of the means for operating the zero stop.

Fig. 56 is a detail of mechanism for operating the pin box.

Figs. 57 and 58 are details of the mechanism for resetting or throwing the type wheel controlling gear back to zero.

Fig. 59 is a view in elevation of means for feeding cards out of the machine; and Fig. 60 is another view of the same mechanism at right angles to the plane of Fig. 59.

Figures 1, 12:
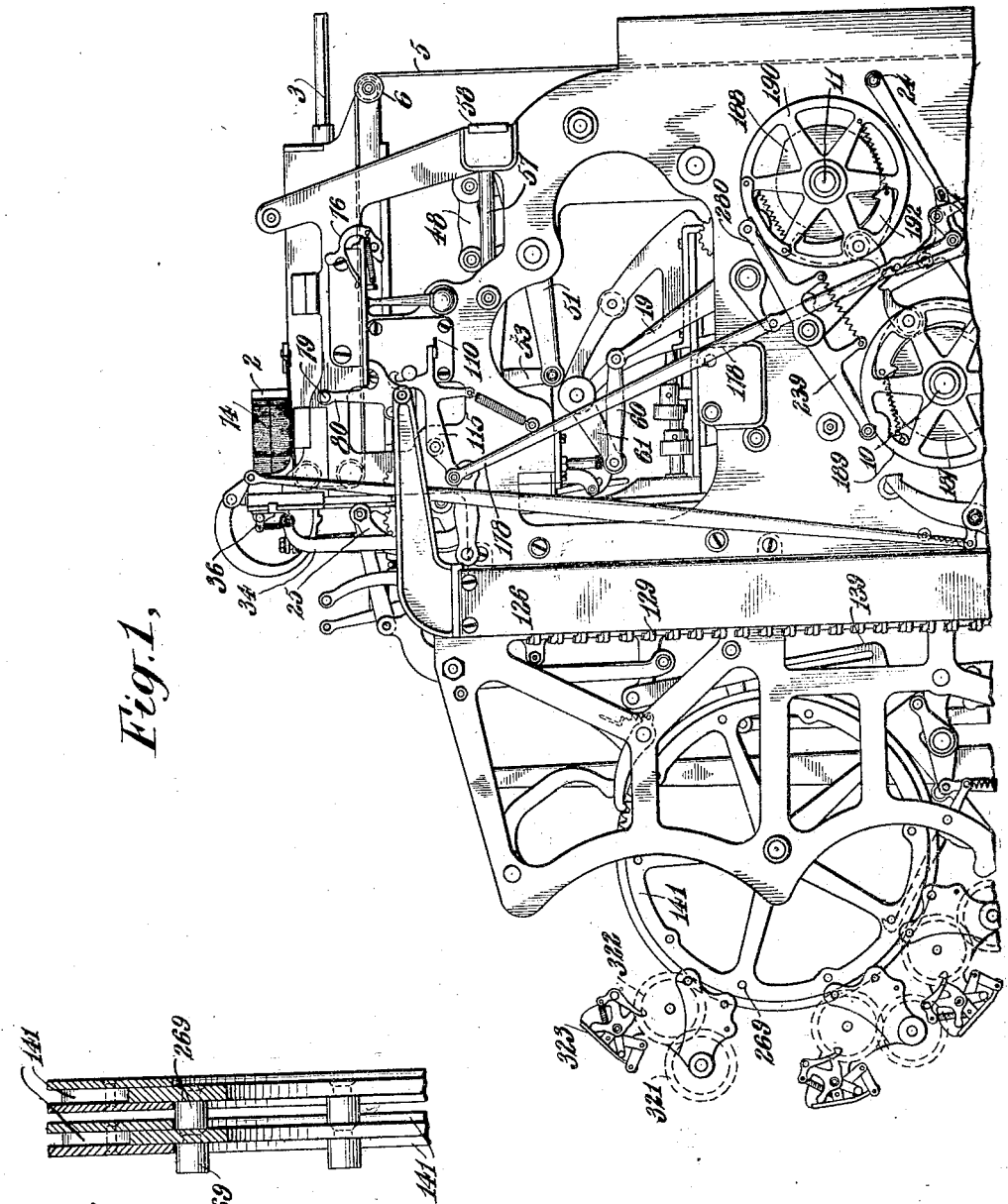
Figure 1 is a side view of the complete machine as viewed from the left.
Fig. 12 is a sectional detail of certain wheels or disks used in the device.

The drawings are intended to show all of the details of construction, whether specifically described or not, and to facilitate their complete understanding, all corresponding parts, as far as may be necessary, are indicated by the same reference numerals. For the sake of brevity, the description will be largely confined to a statement of purpose and mode of operation, as the specific construction of the elements is not in most cases of the essence of the invention, their functions being of more importance than their form.

Let it be assumed that it is desired to tabulate from a large number of perforated cards any given data. For example to total all the values represented by the perforations in a given column of such cards, whatever these be, perhaps cost of certain articles, workman's wages, the number of males or females in a certain district of the city. A bunch or pack of the cards is placed in the machine and run through, and by the means to be described, pins which pass through the perforations for which the machine is adjusted or set to operate, will effect or control the operations of the adding, printing and other functions of the machine.

Primarily the cards must be rapidly and properly fed, and the description of the apparatus may begin with a description of the feeding mechanism.

By reference to Figs. 5, 6 and 8, the general form and arrangement of the machine as a whole will be comprehended. The chief operative parts are assembled in a central frame, from which on each side extend narrow chambers like wings which contain certain adjusting means hereinafter to be described.

At the top of the central frame, see Figs. 3, 5, 7 and 11, there is a card receptacle or holder 1 into which a pack of perforated cards to be worked with are inserted. The cards are pushed forward by a plate 2 guided and centered by a rod 3 suitably supported and carrying a cross bar 4, Fig. 7, to which cords 5 running over pulleys 6 are attached, and which by means of weights 7 is forced up against the bunch of cards.

The shaft by means of which power is applied for the operation of the machine is designated by the numeral 8 and it may be turned by power or by hand. Upon this shaft is mounted a gear wheel 9 that imparts rotation by the means hereinafter to be described to a cam shaft 10 and a shaft 11. On the cam shaft 10 is a cam 12, Fig. 36, which has a groove in one face with which engages a pin 15 on a double lever 13 pivoted below and in the rear of said shaft at 14 and by the rotation of the power shaft this lever 13 is oscillated, and being connected by a link 16 with an arm 17 rigidly connected with a shaft 18 imparts an oscillating movement to said shaft.

To the rock-shaft 18 are secured two angle levers 19 which partake of the rocking movement of said shaft. The lower ends of these levers engage by pins with slots in two cam plates 20 and 21 and by their swinging movement force such plates back and forth. The cam plates 21 are pivoted at 22 and turn about such pivotal point under the action of the lever 19 and this movement is imparted by offset link connections 23 to pivoted bell crank levers 24, which in turn impart vertical reciprocating motion to bars 25 pivotally connected therewith.

The bars 25 are connected to a crossbar 26 in front of the card holder and support the said bar which by means of links 27 is connected to fixed stops 28 so that when the bars 25 are raised the crossbar 26 swings away from the plate 29 against which the pack of cards is held. The cross bar 26 carries blades 30 which are normally in contact with the cards either below the plate 29 or through slots therein, but by the outward movement of the crossbar these blades, see Fig. 11, are lifted and moved away from the front card of the pack.

The cam plates 20 which are also moved back and forth by the lever arms 19 are connected by links 31 to the ends of bell crank lever 32, pivoted at 33 and pivotally connected with bars 34, to which they impart a vertically reciprocating movement. The bars 34 are connected with a sliding plate 35 carried by the card holder, which plate has pivoted to it plates or levers 36 which pass through slots in the front plate 29 and which, by the movement imparted to the plate 35, ride up and over the top edge of the first card in the pack in the holder, and in the downward movement of the plate 35 pull a card down toward the gripping rolls 37.

Figure 9:
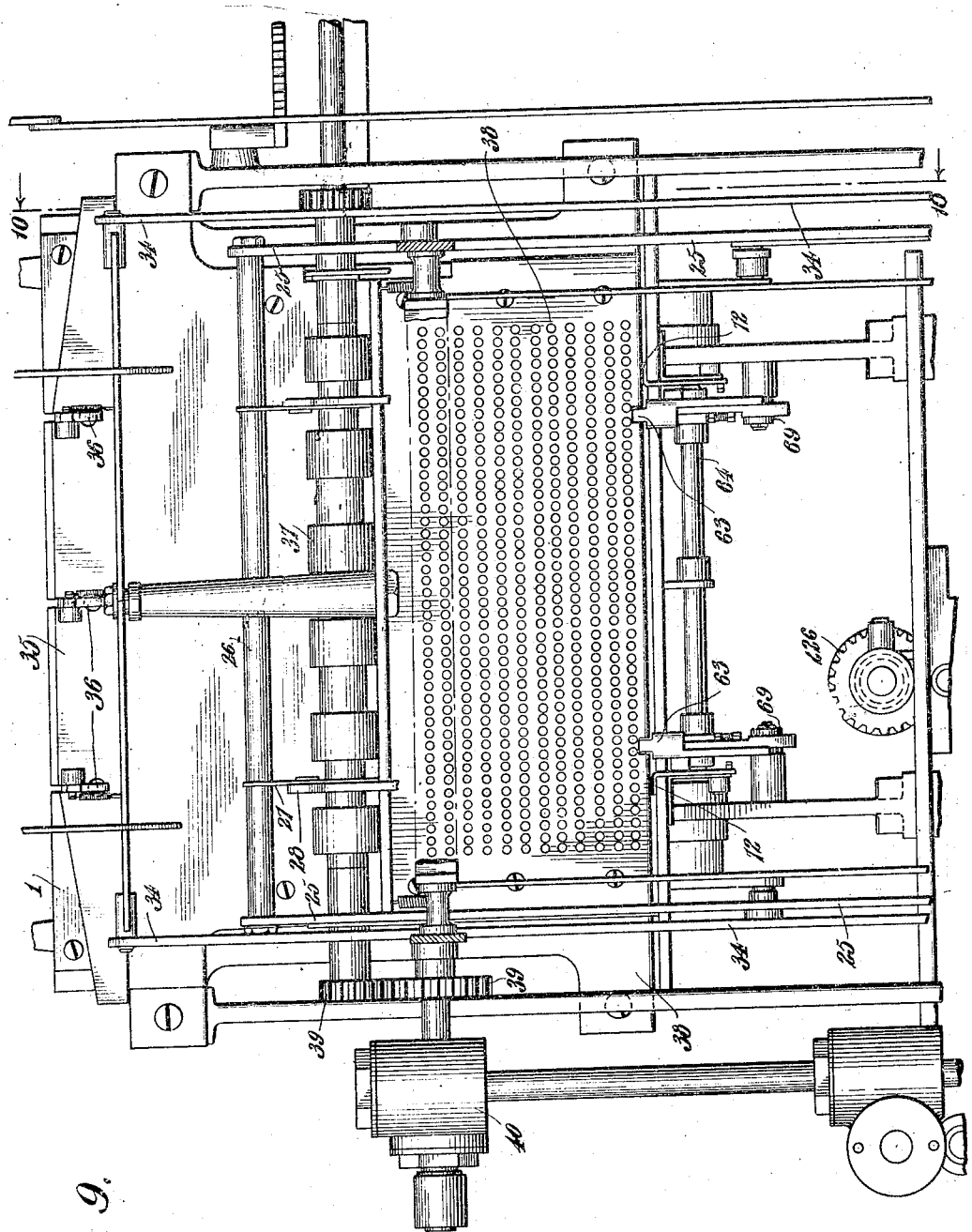
Fig. 9 is a view in elevation of the upper portion of the machine with parts back of the perforated pin plate removed.

These parts are so timed that the blades 30 move upward first, but before they return the plate 35 has moved up and down so that the card is brought down in time to be engaged by the blades 30 and by the latter pushed forward to the rolls 37. These latter carry the card downward into position behind the perforated pin plate 38, Fig. 9. The rolls 37 are continuously revolved by gears 39 which are driven by spiral gears in a casing 40 operated by a shaft 41, gearing by a pinion 42 with a gear wheel 43 on the cam shaft 10, which, as above explained, is driven by the power shaft 8.

The pin box 44 is or may be of the general kind commonly used in devices of this character, and though shown in detail requires no extended description at the moment. It is furnished with as many pins 96 as there are points in the cards where holes are or may be punched, and these pins are spring seated so that when the box is moved toward the perforated pin plate those pins which do not encounter holes in the cards will be forced back. The perforated pin plate 38 is immediately below the card holder and when a card is brought to proper position the points thereon where holes are or are designed to be punched, register with the perforations in said plate.

When a card is in place, the pin box is moved forward, and this movement is accomplished by the means best shown in Figs. 10, 22 and 56. On the cam shaft 10 is a cam 45 with a properly designed groove in one face in which works a pin on a double lever 46, Fig. 40. The lever is pivoted at 47, and has a shorter arm extending up above its pivotal point, the end of such portion being a pivotal connection with a link 48, by which it is connected to an arm 49 rigid on a shaft 50, from which it follows that a rocking movement is imparted to the shaft 50 from the cam shaft 10.

At each end of the shaft 50 is rigidly secured a bar 51 connected to a stout retractile spring 52 at one end and at the other to a link 53 from the middle point of a toggle lever 54, and these toggles are, therefore, operated by the rocking of the shaft 50. In Fig. 22 the toggle is shown raised, while in Fig. 10 its members are shown as straight, or in line.

One member or end of the toggles 54 is pivotally connected to the frame at 55, Fig. 29, while the other is similarly connected to the pin box, so that as the power shaft rotates and lever 46 is turning, the pin box is moved forward and back. At its forward side the pin box has two points of support on rollers 56, while it is guided and steadied by a bar 57 secured to its rear side and working through a guide or fixed bar 58 in the rear of the machine.

From the above it will be understood that each time that a card has been brought, by the operation of the means employed, into its operative position back of the perforated plate 38, and this will be done in each cycle of operation, the pin box is reciprocated and those pins which pass through perforations in the card perform their allotted functions, as will be hereinafter set forth. For the moment, therefore, it will be more convenient to follow the operations of the machine other than those involving the setting of the type wheels and such operation as the printing therefrom. Assume, therefore, that the pin box has been moved forward and then returned, as soon as the pins have been withdrawn from the cards a pair of nippers seizes the card in the holder and draws it down. This is effected by the following means:

The upper ends of levers 19, worked by the cam shaft, as heretofore described, are pivotally connected with links 60, which are pivoted to the ends of arms 61, rigidly connected to the shaft 62. From the same shaft extend arms 59, rigid therewith, the end of which forms one member of the jaws 63 and the other member of which is pivoted to the arms 59 and operated in by a spring 64 with a tendency to close the jaws. Just after the pin box has moved to a point where its pins enter holes in a card, a stop 65 on said box encounters pivoted levers 66, the opposite ends of which, when the levers are moved, strike projections on levers 67, pivoted to the arms 59, and lift their ends out of engagement with the pivoted member of the jaws 63, and permit this jaw held open by such engagement to respond to the free action of the spring 64 and close on the lower edge of the card. As the pin box moves backward, the arms 59 also swing back carrying the card with them until it has reached the position shown in Fig. 37.

In this position the lever 67 has been carried against a fixed stop 69, and forced out of engagement with the jaw 63, whereby the latter is locked in its open position, and so it remains until it is again released by the pin box as just described. As the arm or arms 59 descend, therefore, they draw a card down upon a table 70 and under a roller 71, Fig. 37, such roller at that instant being raised and the card is then, by the subsequent lowering of the roller, forced out to one side into a receptacle of suitable kind.

In order to prevent the next card fed by the rolls 37 from falling below its proper position, in case the jaws have not fully returned to their normal position, a lever 72 is pivoted to the frame and drawn by a spring 73 into the position shown in Fig. 37, in which its end lies in the path of a card. When the jaws have returned to the position shown in Fig. 36, either they, or a suitable pin or projection therein, push forward the lower end of the lever 72 and thus turn its upper end to the right, out of the path of the card, permitting it to be gripped by the jaws.

Figure 41:
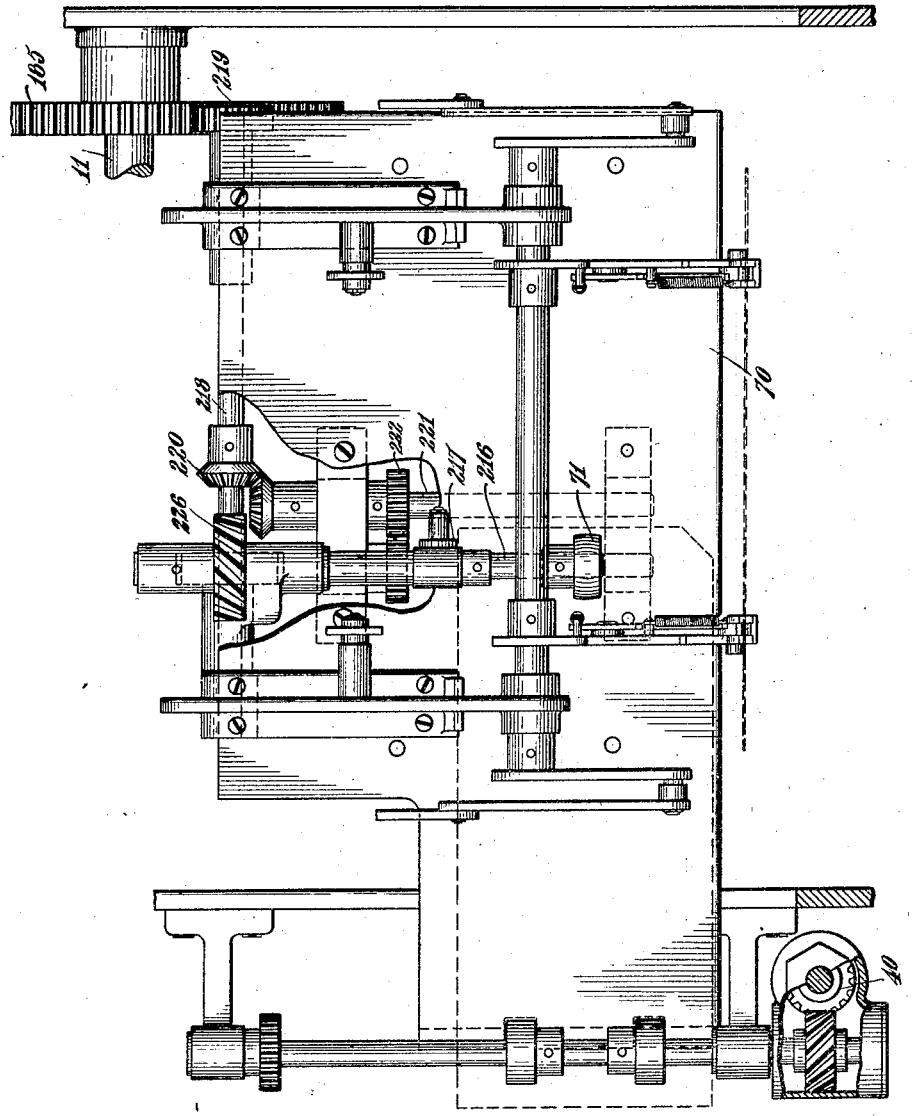
Fig. 41 is a detail view in plan showing rollers for extracting cards from the machine.

The means for raising the roller 71 to permit a card to be drawn under it is shown in detail in Figs. 41, 59 and 60. In gear with the toothed wheel 185 on the shaft 11 is a pinion 219 on a spindle 218, which carries a bevel gear 220, and at its end extended beyond said gear, carries a spiral gear wheel 68. The bevel gear 220 meshes with a gear on a short shaft 221, which carries a gear 222 that meshes with a gear on a shaft 223, which carries a roller 224, being in a slot in the platform 70. Parallel with this shaft 223 is a shaft 216, having a long bearing in an arm 235 which is mounted on a transverse shaft 225. On the shaft 216 is a spiral gear 226 which meshes with the gear on shaft 221, and by this means rotation is imparted to the shaft 216 from the pinion 219, while at the same time the shaft 216 may be turned about the shaft 225 on a counter, as one of the spiral gears simply rolls on the other.

On the drive shaft 8 of the machine is a cam disk 227 on, the periphery of which travels a roller in the end of a bell crank lever 228, the other end being pivotally connected with a link or flat bar 229, connected to the shaft 216 or to a sleeve thereon, and this lever is held in contact with the cam disk 227 by a spring 230. From this arrangement it follows that during each revolution of the drive shaft 8 the shaft 216 is raised about the shaft 225 as a center, without interfering with its rotation, and the elevation of the shaft 216 occurs during the time that the jaws 63 are drawing a card down and laying it upon the platform 70. When a card has been thus laid on the platform the shaft 216 is lowered to its normal position and its roller 71 in conjunction with the roller 224 forces the card to one side off the platform into a suitable receiver therefor.

A more ready understanding of the manner of using the machine may be had if the construction and operation of the pin box 44 is quite understood, and we therefore refer to those figures which illustrate such construction.

Extending up through the top of the pin box 44, Figs. 23 and 30, are two rows of pins 81 and 82. The pins 81 have flanges 83 at their lower ends and over these flanges lies the edge of a plate 84 secured to a shaft 85. The plate 84 is rocked by means of an arm 86 fast to the shaft 85, Fig. 22, and connected by a link 87 to a lever 88 pivoted at 89. When this lever 88 is shifted, therefore, the plate 84 is turned downward and as it lies over the flanges 83 all of the pins 81 are depressed. This depression lowers one end of a lever 90 pivoted at 91, which lies under the flanges 83 and raises the other end of said lever thereby raising all of the pins 82 by the engagement of such end with flanges 92 on those pins.

To the lever or arm 88 there is also pivotally connected a bar 231 having a downwardly extending projection 232 with an inclined edge, which lies normally back of a stationary pin 233 and prevents the forward movement of the lever 88. When this lever is operated, therefore, sufficient force must be applied thereto to cause the projection on bar 231 to ride up over the pin 233 and thus raise the bar against the force of a spring 234.

To the pins 82 are connected plates 93, which are fast to a spindle 113, constituting an extension of the pins and mounted in bearings in the pin box so as to be free to turn. The forward edges of the plates 93 are formed with a series of notches or cut-away parts 94, into which extend the rear ends 95 of the pins 96 which are normally drawn forward by springs 97. From the rear edges of plates 93 extend arms 120 and 121, the former of which carries a pin 112, the purpose and function of which will be hereinafter described, and to the latter of which, 121, is connected one end of a series of spiral springs 122, the other end of which is connected to plates 123, secured in the side of the pin box, these springs acting to hold the plates 93 in their proper normal position.

There are as many pins 81 and 82 as there are columns of pins 96, and by the rocking of the lever 90 all of the pins 82 are raised and retained in an elevated position by the engagement with the under sides of the flanges 92 of spring plungers or catch pins 98. In this condition their relation to the ends 95 of the pins will be as shown in Fig. 25, but if the pin 82 be depressed and forced down by the plunger 98, then this relation will be that shown in Fig. 24.

On the upper edge of each cut-away part or notch 94 is a projection or cam 100 and on the top of the pin extension 95 is a cam or projection 101. These cams are designed to lie normally in the same line and each has a short straight edge so that when in engagement, as they will be when pins 82 are depressed, the pins are locked to the plates 93, and can not be drawn forward by the springs 97 connected to them, but should the plate 93 be then slightly turned about its pivotal center 113, the squared portions of the cam are disengaged, whereupon the pins are free to be pulled forward by the springs. In such movement in either direction the cams ride over each other and thus operate to swing the plate 93. The cams 100 and 101 are brought into engagement, it will be observed, by depressing the pins 82, but all such pins 82 as are not thus depressed leave the pins coöperating therewith free to move in and out of the notches 94 without moving or turning the plates 93.

On one side or end of the pin box 44 is a projection 102, Fig. 33, which just before the end of travel of the box, hereinbefore described, strikes a spring actuated lever 103 pivoted to a lever 104 which in turn is pivoted at 105 and engages with a stop pin on said lever, and by such engagement it imparts a short movement to the left, Fig. 33, to lever 104. In the said lever is a slot 106, in which works a pin 107 on a lever 108, pivoted to the under one of two flat bars 109, 110, Figs. 25, 26 and 33, and on each movement of lever 104 this under bar is caused to slide in its bearings in the pin box.

The bar 109 contains relatively large round holes 111, through which the pins 112 on the plates 93 extend and are close to the edges of said holes, so that each time that the plate 109 is moved back the pins 112 and with them the plates 93 are swung about the pivotal line 113 sufficiently to move the cams 100 and 101 out of engagement and to thereby leave the pins 96 free to shoot out from the notches in plates 93, provided they be otherwise free. The instant of this release, however, is at a time when the pins 96 are brought up to the plane of a card in the card holder, so that no one of a vertical column of such pins, assuming them all to be locked to plates 93, may pass through the perforated plate and card unless it be in line with a punched hole. In such event the pin passes through the card and moves to its limiting position, one pin in Fig. 23 being shown in such position. The unlocking action, moreover, because of the fact that the stop lever 103 is pivoted, is only momentary, and at all other times the pins are locked by the cams 100 and 101.

Immediately above the flat bar 109 is the bar 110, which has a series of slots therein through which extend the pins 112. Normally the plate 110 is not moved by the said pins, as it moves with the said bar 109, being secured thereto, and forced to its normal or operative position relative to bar 109 by a spring actuated lever 114, pivoted to an arm 124 extending from the plate 109 and engaging with a pin 125 on the bar 110, see Figs. 31 and 32, but if any pin extension 95 is either forced back into one of the notches 94 in plate 93, or, being released by the turning of the plate, shoots out from such notch, then the plate 93 is turned by the operation of cams 100 and 101 to such an extent that the pin 112 engages the bar 110 and throws it back or to the left, in Fig. 33, and withdraws its end extending through a stationary plate forming a part of the frame of the machine from under a spring actuated lever 115, Fig. 35, which then, in obedience to the force of its spring 116, swings down about its pivotal point 117 until a hook 118 thereon engages with a fixed stop thereon. The lever 115 is connected to a means for stopping the machine in the event of such movement, which will be hereinafter described.

The cards 74 for which this particular machine is designed are such as shown in Fig. 13. In this card there are forty-five vertical columns of figures or points in any one or more of which holes may be punched which by their location represent dates, digits, or any other data, and the machine should be so designed as to operate for any hole in any column, for which reason the pin box contains as many pins as there are points or holes. Assume that a certain number of such cards are to be run through the machine for tabulating the values represented in a certain column or columns, and only those cards punched with a certain date or a certain workman's number or the like, are to be used for operating the recording and printing devices. In such case the machine must be set to take only those cards which are wanted, and to stop if some other and different card comes through.

For this purpose, before starting the machine, one of the cards of the kind described is laid on a platform 75, Figs. 7 and 13, and fastened in correct position thereon by a clip 76. The edge of the platform has a series of teeth or notches 77 which are numbered from 1 to 45 to correspond to the forty-five columns or vertical rows of points for holes in the card. Sliding out from the machine is a round bar 78 which is capable of a partial rotation, and carrying at its end an arm 80 extending up at right angles to the plane of the platform 75 and having a knob 79 thereon by means of which the plate or arm 80 may be turned down into any one of the notches 77.

The bar 78 carries a thin plate or arm 99, Figs. 13 and 29, and when it is pushed in or out and then turned until the arm 80 thereon is forced into one of the teeth or notches 77, the arm 99 will lie immediately over the pin 82 corresponding to such notch and this pin will therefore be pushed down and the plate 93 attached thereto will be brought to the position relatively to the ends 95 of the pins which enter its notches shown in Fig. 24. This is known as setting the pins in that particular column, so that only those pins will be free to pass through the card for which holes are or should be provided, in other words that column is controlled so that it will allow only cards with the desired date holes, or workman's number holes, or the like, to pass.

By the first forward movement of the pin box all the pins in any controlled column are brought up to the plane of the card and all are pushed back into the plate 93 and locked except that one which meets a hole, and for all subsequent movements this condition is preserved. Assume, however, that a card comes through the machine that has a new or different hole in a controlled column, then when the pin box is moved forward until the pins are brought up to the plane or surface of the card, and up to which time all of the pins but one are locked, that pin which meets the new hole will be with all the others in the column unlocked as before described, and hence will shoot out, and in so doing will turn its plate 93 sufficiently to move the upper flat bar 110 and stop the machine. This will occur whether the pin which was free be forced back or whether it also finds a hole and remains out.

Provision may in a similar manner be made for stopping the machine in case a hole is by accident or design punched in any other column that may be set in this way under control. For example, any unused column may be thus controlled, in which there are normally no holes. By the first movement of the pin box all of the pins in such column will encounter the card and be forced back and locked, but as they are momentarily unlocked in each forward movement of the pin box, one of them, should it meet a hole in the card, will shoot out, turn its plate 93, and stop the machine. This possibility of controlling columns avoids the necessity of using special stop cards.

The chief function of the machine, it will be borne in mind, is to record and to print in given columns on a paper strip either the data indicated by punched holes in cards, or to compute the total of any number of amounts so represented, for which purpose any pin that finds a hole representing such data or values should pass through that hole and operate on the means for turning or controlling type-wheels and mechanism for printing therefrom. I therefore provide for such adjustment of the machine that holes in any given column of a card will cause to be set for printing a type-wheel over any predetermined position or column on a strip or ribbon of paper, a letter or figure indicated by such hole, by the means illustrated in Figs. 7, 8 and 14 to 19.

On each side of the machine is an extended wing or box 126, in which are series of parallel bars 127 equal in number to the columns in a card, and on each of these bars slides an arm 128 carrying a catch 129 actuated by a spring 130 to normally engage with notches in a plate 131, and to thereby lock the sliding arm against movement along the bars 127. By gripping the catch lever 129 with the fingers and depressing it, it is released from the plate 131, so that an arm 128 is free to slide back and forth on the rod 127.

To the arms 128 are connected flat bars 132, movable in correspondingly shaped holes in shafts 133, mounted in the central portion of the frame, and said flat bars carry at their ends sleeves 134, to which are fixed pinion wheels 135. There are thus in the two side wing boxes as many parallel guide bars 127 as there are columns in a card, each of which by means of the arms or levers 128 moves a sleeve 134 carrying a pinion 135.

There are two series of long parallel rack bars 136, 137, Figs. 14 and 19, in the front of the machine, suitably supported and guided with the capability of vertical movement, and the rack bars 136 are designed to move through distances determined by the particular pins which project through the card in line with stops thereon, and these bars are arranged side by side in a single group. The pinions 135, by the adjustment of the levers 128 in the right hand wing box are brought into gear with the rack bar 136, which will be controlled in its movements by the pins in the column in the pin box corresponding to a desired column of holes in the card.

Each rack bar 137 has a projection 138 to which is pivoted an arm 139 having a short rack thereon, guided by a bar 140 working in a slot in said arm which causes it to engage at the proper moment with a hundred toothed gear wheel 141 constituting one of several groups of such wheels, as shown in the figures just referred to, and which are designed to set the type-wheels, and after any rack bar 136 has been put in gear with the shaft 133 the other pinion 135 on said shaft is adjusted from the left hand wing box to throw the shaft into gear with any gear wheel 141 which operates that type wheel which is in the position desired for printing the figures corresponding to the column of pins controlling the rack bar 136.

In other words, as the pinions on any shaft 133 turn together, either may be set to engage with any pin controlled rack bar and the other to engage with any rack bar 137 so that the data corresponding to any hole in any column on a card may be printed in any desired part of a sheet or strip of paper.

The means for throwing the racks 139 into gear with the gear wheels 141 at the proper moment are shown in Fig. 54. In this figure the bar 140 which engages with the slots in each rack 139, is carried by the arm 243, mounted on a transverse shaft 244 mounted in the frame. This shaft is rocked by an arm 245, fixed thereto, which is connected to a link 246, connected to a bell crank lever 247, the other end of which is connected by a link 248 with one arm of a lever 249, pivoted at 250 and engaging with a cam groove in a disk 251 on the cam shaft 10. This cam is so designed that at the proper moment it operates to throw the arm 243 and to thereby bring all of racks 139 into gear into their respective gear-wheels.

Referring now to Fig. 19 for an explanation of the means for controlling the movements of the rack bars 136, in accordance with the position of the pins that may pass through the perforated plate and holes in a card. If the hole which is presented be a zero hole the gear wheel 141 and the type wheel controlled thereby of course, should not be moved, and for this purpose there is connected with each rack bar 136 a long bar 142 by means of a bell crank lever 143, pivoted to a second bell crank lever 144, pivoted to a projection from rack bar 136. The lever 143 has a spring 145, which acts to normally move the long end of bar 142, which is pivoted at 146 to the right, and to maintain a hook at its end over a long zero bar 147 and this locks it in elevated position.

If a zero pin pass through the card it does not touch the bar 142 as the upper end of the same is shaped as shown so as to prevent such engagement, and hence the bar is not unlocked or released from its engagement with the zero bar 147. However, after the pins have completed their forward movement, by the operation of the machine the zero bar 147 is raised, and this lifts the bar 142, with the result that the lever 143 raises that arm of the lever 144 to which it is pivoted and swings the other end of said arm out of engagement with a shoulder 148 on a flat bar 149 which in each cycle of the machine is moved up and down. By the upward movement of the flat bar 149 it will be understood the rack bar 136 is moved by a pin 252, carried by the bar 149, engaging with a shoulder 253 in the rack bar. By the downward movement of the bar 149 the rack bar, when in engagement with said bar 149, is drawn down by the hooked end of lever 144, locking into the shoulder 148 on the bar 149. The rack bars are guided by pins 154 working in vertical slots therein.

When the bar 149 is freed from the engagement with the rack bar 136 its downward movement is independent of that of the rack bar, and hence the gear wheel 141 in mesh with said rack bar is not turned. The means for raising the zero bar 147 is shown in Fig. 55. On the cam shaft 10 is a cam disk 236 with a groove in one side in which works a pin in the end of a bell crank lever 237. The other end of this lever is connected by a bar or link 238 with the zero bar 147, and by the swinging movement of the lever 237, the bar 238, and with it the zero bar is raised at the proper moment.

On the other hand assume that some other than a zero hole occurs in a card and comes over one of the pins in the column. In such case the pin passes through the card, strikes the bar 142 and forces its end out of engagement with the zero bar 147, so that bar 149 is then free to draw the rack bar down until the end of a lever 151 pivoted at 152 to the bell crank lever 144 and thrown to the right by spring 153, strikes the protruding pin which operates to stop the lever 151, and by the swinging of lever 144 to unlatch it from the stop 148 on bar 149. This enables the bar 149 to complete its downward movement, leaving the rack bar 136 and the bar 151 stationary. The last named parts have, however, moved through a distance which is proportional to the value represented by the position of the protruding pin and this movement has been communicated to the rack bar 137, which, moving upward a corresponding distance, has turned the gear wheel 141 accordingly.

The normal position of the rack bars 136 and 137 is as shown in Figs 10, 17, and 19, in which position the pinions 135 could not be shifted and moved between them in the preliminary process of adjustment. Provision must therefore be made for spreading the rack bars to permit of such adjustment being made, and the means for this are shown in Figs. 10 and 29, so far as may be necessary to its understanding. The rack bars slide over rods 154—155 in a two-part frame 156, which is held together at the top and bottom by spiral springs 157. A lever 158 is fast to a shaft 159 at the top of the frame, and said shaft has a squared or cam-shaped part 160, indicated in dotted lines in Fig. 10, which engages the two sides of the frame 156 and when turned forces them apart against the tension of the springs 157. The said lever 158 has an arm 161 extending therefrom and to this is pivotally connected a bar 162, which at the bottom of the frame, not illustrated in detail, connects with a similar arm that turns a shaft corresponding to shaft 159, and thereby opens the other end of the frame.

Reference may now be had to Figs. 2, 4 and 40, in an explanation of the means employed for raising and lowering the rack bars by means of the flat bars 149. These bars, as has been set forth above, are adapted to raise and lower the rack bars and have a range of movement sufficient to carry the stop lever 151 entirely across the bank of pins in the pin box. On each side of the machine on the cam shaft 10 is a cam 163, that operates a lever 164 pivoted at 165 and connected at its end with a link 166 pivotally connected to one arm of a T-shaped lever 167 pivoted at 168 to the frame. Above the lever 167 and pivoted at 169 is a lever 170, the longer end of which is pivotally connected to a rod or bar 171 which is known as a setting bar. There are as many of the bars 171 and levers 170 and coöperating parts, as there are columns in a card, and the said bars 171 extend up to a setting plate or table, which is not shown in the drawings. The end of lever 170 has two teeth or projections and by means of a spring 172 an arm 173 having a single tooth or projection is held in engagement with the toothed end of lever 170.

The arm 173 is pivoted to and carried by a plate 174 pivoted at 168 and connected by a link 175 to a plate connected to rack bar 136, and the pivotal support at 169 for lever 170 is also carried by the said plate 174.

Before operating the machine it is set by rods 171 to throw into operative condition as many of the rack bars 136 as may be needed, which is done by shifting the bars 171 so as to raise the toothed end of lever 170 until its lower tooth or projection engages with the tooth on the arm 173, or in other words, is brought and retained in the position shown in Fig. 4. In this position the end of an arm 176 on lever 170 is brought over a bar 177 carried by the arms of the levers 167, so that as the cam 163 turns and the levers 167 are rocked, the bars 177 will engage the arms 176 and by reason of the arrangement of the parts involved the long arm 174 is raised and allowed to descend, thus raising and lowering the plate or bar 149 and hence the rack bar operatively connected therewith. Manifestly, if the rods 171 are pulled up, the projection on arm 173 engages with the upper notch in the lever 170 and the arm 176 is held out of the path of the bar 177 in levers 167, so that the corresponding rack bar is not set and not operated by the machine.

It may here be stated that all levers 170 which have not been set as above described and as shown in Fig. 4, will, by the operation of the machine, draw down their corresponding bars 149, and leave them down resting upon a cross bar 252, and this requires special means for restoring these parts to normal position which, as they involve certain parts not yet described, will be set forth later.

The mechanism for stopping the machine when a wrong or other predetermined card passes through the machine is shown in Figs. 42-46. Pivoted to the lever 115, Fig. 35, is a long bar 178 extending down to the bottom of the machine where it is pivotally connected with one arm of a right angled lever 179, the other end of which acts as a stop for the free end of a lever 180 pivoted to the stationary shaft 181 and held down upon a cam disk 182 on the drive shaft 8. Normally the flat bar 110 under the edge of the lever 115, see Fig. 35, maintains the rod 178 depressed and the lever 179 out of the path of the lever 180, but should no card, or a card with a wrong hole operate by the means hereinbefore described to withdraw the bar 110, then the bar 178 rises and this carries the end of lever 179 into the path of the lever 180. The cam disk 182 has a raised portion on its periphery and when this comes under the lever 180 it raises the latter and also, if it be in its path, the lever 179, which is pivoted to and rocks a lever 204 pivoted at 212, see Fig. 50, and has fixed thereto a stop arm 183, throwing this stop into the path of arm 184 carried by a wheel on the cam shaft 10, the nature and function of which will be shortly described.

The gears 9 on the drive shaft 8, the gears 43 on the cam shaft 10 and the gear 185 on shaft 11 are always in mesh, and rotation may be imparted to shafts 10 and 11, whenever the drive shaft rotates by the following means. The gear wheels 43 and 185 are fixed to sleeves 186, Fig. 49, and fast to the other ends of these sleeves are two disks 187 and 188 with cam surfaces and notches in their peripheries. Fixed to the ends of the two shafts 10 and 11 are wheels 189 and 190 which carry pivoted spring actuated pawls 191 and 192, which engage with notches in the disks 187 and 188 in such manner that under normal conditions a rotation of the gears 43 and 185 imparting rotation to the disks 187 and 188 carries with said disks the wheels 189 and 190 and in this way imparts rotation to the shafts 10 and 11.

When the lever 204 and the stop arm 183, by the means described, are shifted so that arm 183 is thrown into the path of the stop 184, the movement of the stop 184 tilts the pivoted pawl 191 with which it is rigidly connected, and thus releases the wheel 189 from the disk 187, and it therefore ceases to rotate, and the cam shaft to which it is fixed also comes to rest. Normally, a pivoted lever 193 stands in the path of a stop 194 carried by the wheel 190 and controlling the pawl 192 and hence this wheel is thrown out of connection with the disk 188 and does not rotate, but when the cam shaft and the operative parts of the machine are stopped by a card, it is desirable that a total be printed on the record strip before resuming the operation and going on with other and proper cards. For this purpose the lever 193 is thrown out of engagement with the stop 194 and this operation, it may be assumed for purposes of the present case, may be performed by hand. For example, a push button may be connected to a hole 195 in an arm 196 of the lever 193, and by the depression of this push button during the first revolution of the drive shaft 8 after the wheel 189 has been stopped, the lever 193 is thrown out of the path of the stop 194 and the wheel 190 is thereby released and permitted to make one revolution in company with the drive shaft during the record revolution of the latter after the stoppage of the wheel 189, when it will be stopped by the means and for the purpose to be described. It should be noted that in the operation of printing a total the drive shaft makes two revolutions while the shaft 11 which controls the printing, clearing and resetting mechanism makes but one, and this is accomplished by the following means.

On the shaft 181 is pivoted a lever 197, see Fig. 47, to which is pivoted a lever 198 at the point 199. This lever has two projections or teeth 200 and 201, and a notch with which normally engages a spring retracted locking lever 202 which holds the lever in the position shown in Fig. 47. In the drive shaft disk 182, but on the rear side of the same, is a pin 203 which does not normally engage either of the teeth 200 or 201 as the lever 197 is held in a position in which these teeth are out of its path of movement, but when the stop arm 183 is shifted to the left to engage the stop 184, the right angled portion 204 to which said stop arm is fixed, is tilted to the position shown in Fig. 42 by the upward movement of the bar 178, and is held in that position by the engagement of a projection on a pivoted spring actuated lever 205 with one of a series of notches 206 in its widened end.

The arm 204 being thus depressed, forces down the end of lever 197 and carries the tooth 200 on lever 198 into the path of the pin 203 on the disk 182. On the first revolution of said disk after the stoppage of the wheel 189 the pin 203 is encountered and the lever 197 is moved one step and the latching lever 202 rides out of its notch, locking said lever 197 in its new position. By the next revolution of the disk 182 the pin 203 strikes the tooth 201 which has now been brought into its path, and the lever 198 is turned to its limit and carries down the end of lever 197 to which it is pivoted, and raises the other end of said lever with the result that the arm 204 with which lever 197 is in contact is thereby raised and locked in its raised position by the lever 205. When so raised the stop arm 183 rigid with it is shifted into engagement with the stop lever 193 and the latter is thereby thrown into the path of the projection 194 and this operates to stop the rotation of the wheel 190.

It is essential that the drive shaft make two revolutions each time that a total is to be printed and after the stoppage of the wheel 189, because in this, as in all machines of like nature, the paper strip or sheet on which the record is printed is fed a step by each revolution of the drive shaft. When a total is printed, therefore, there should be a space between the total and the column of figures above it, as otherwise in manifolding there would be nothing to indicate that it was a total, whereas on the first sheet such distinguishing space may not be necessary as the totals may there be indicated by a different colored ink or ribbon.

As will be set forth below, each revolution of the shaft 11 clears the machine or sets all of the wheels 141 in their zero positions, hence if the drive shaft is to make two revolutions to print a total the gear wheels 141, if left in engagement with type wheels, must not be reset until after the impression is taken, so that some means must be employed which will permit the drive shaft to make one turn to space before the clearing or printing shafts are permitted to make a revolution. In practice this would be done automatically by suitable mechanism attached to the hole 195 in the lever 193 and operated at the proper moment by some part of the machine, but such mechanism is not illustrated in the present case. For this reason we have assumed on the part of the operator such skill as will enable him to push down the lever 196 at the proper moment or during the interval in which the drive shaft is making its first revolution after the stoppage of the wheel 189.

In Fig. 42, two levers 239 and 240 pivoted at 241 are shown. These levers have stops or projections that travel over the peripheries of the wheels 189 and 190, and act as impositive locks to prevent any free movement of said wheels. To the side of each wheel 189 and 190 is attached a notched bar 242 against which the ends of the bars 239 and 240 abut after a full revolution and when the wheels are stopped, to prevent backward vibration or movement of said wheels.

The first card passed through the machine, whatever its character, cannot operate to raise the bar 178 and stop the cam shaft, for said bar carries a pin 209, which is engaged by the hooked end of a lever 210 which is pivoted at 211 to a lever 213, turning about the center 214 and engaged by a pin 215 set in the end of the lever 204. Normally these parts are in the position shown in Fig. 45, with the hooked end of lever 210 lying over pin 209, and locking the bar 178 against upward movement. But after one revolution of the drive shaft the pin 209ª strikes the tail of lever 210 and swings said lever about its pivotal point 211 and frees it from engagement with the pin 209. When the pin 209 leaves the lever 210 the latter swings back to the position shown in Fig. 46 in which its head lies against the pin 209, but not over it. Hence, after the first revolution of the drive shaft, or after the first card has passed the pin box, the machine may be stopped by the upward movement of the bar 178.

There are several features of construction and operation involved in the above described machine the presence of which, for convenience and the sake of brevity, have been tacitly assumed. These may now be profitably taken up and described without regard to any fixed order, as their relations structurally and functionally to the machine will be at once apparent.

Referring for example to Figs. 3, 4 and 54. When the racks 139 are withdrawn from engagement with the gear wheels 141 by the means described, other racks 255 should be thrown into gear with the same wheels in order to positively lock said wheels against movement. These racks 255 have also another function, that is to say they constitute an element of the transfer or carrying mechanism for the said wheels. The racks 255 swing on transverse shafts 256 mounted in brackets 257, Fig. 4, and are controlled with relation to the gear wheels by a transverse bar 258, carried by levers 259, supported in turn by a shaft 260 carried by bell crank levers 261 turning about a fixed pivotal point 262. The bar 258 is operated by two independent mechanisms, one of which is link 263 connected to an arm which is rigid with one arm of the bell crank lever 247, so that by the rotation of the cam shaft 10 and the connections therefrom to lever 247 the racks 255 are thrown into engagement with the gear wheels 141 at the same time that the racks 139 are withdrawn therefrom. The operating mechanism is an arm 264 rigid with bell crank lever 261 and connected to a bar 265, which is pivoted to the end of a lever 266, working about a pivotal center 268, in a groove in the side of a cam disk 267 on the clearing shaft 11.

From this it results, first, as above set forth, that when the racks 139 are moved into gear with the wheels 141 the racks 255 are moved out of gear and conversely. Also that when the gear wheels 141 are to be reset or turned back to zero position by the clearing shaft 11, the racks 255 are thrown out of gear with the said wheels by the action of the bell crank levers 261, notwithstanding the fact that at that moment the racks 139 are also out of gear with said wheels.

The other function of the racks 255, to which reference has been made above, is to carry from one gear wheel to the next, and this is accomplished by the means shown in Figs. 3 and 4. Whenever a gear wheel 141 turning in an anti-clockwise direction, carries one of the pins 269, of which there are ten evenly spaced on a hundred toothed wheel, across the zero position for the wheel, that pin comes in contact with the curved end of a bell crank lever 270 of which there are on a transverse shaft 271 nine for each group of ten gear wheels, and moves the free end thereof downward. This movement draws down a stop lever 272 pivoted to the rack 255 at 273 into the path of a cam point 274 on one leaf of what is termed the helix shaft 275.

The movement imparted to the lever 270 throws one of the prongs on its right angled end into engagement with a spring actuated pivoted catch 276 which holds said lever in its depressed condition until by the rotation of the helix shaft 275 the cam 274 on one of its leaves encounters the end of the stop lever 272, and moves the rack 255 sufficiently to cause it to move the gear wheel 141 of the next higher order of units one tooth, whereupon the cam slips over the rod of the stop 272. This movement is controlled and determined by a slot in the bar carrying the rack 255 by means of which the said bar is pivoted to the rack 256. By the further movement of the helix shaft 275 a pin on the side of the same leaf comes into engagement with the catch 276 and releases the lever 270.

After the rack 255 has been swung out of engagement with the gear wheel 141 an arm 277 with a suitable point thereon and which forms part of a bell crank lever pivoted at 278 is swung by a link 279 connecting said bell crank with a bell crank 280 connected by a link 281 with a lever 282 working in a cam groove in a cam 283 on the cam shaft 10, and operates to draw back the said rack 255 to its normal position.

Referring now to Figs. 52 and 53. Mounted in the frame in operative relation to the groups of gear wheels 141 is the helix shaft 275 which carries groups of nine disks 295, each having a cam point 274 on its periphery and a pin 294 on one side, Fig. 4. This shaft is rotated once during each cycle of operation of the machine and the function of the disks or leaves 295 is to carry from one gear wheel 141 to the next whenever such gear wheel has been moved more than ten teeth, as will be understood from the immediately preceding description. The means for rotating the helix shaft are shown in Fig. 53.

On the cam shaft 10 is a disk 296 with a cam groove in the face of which engages a pin on a lever 297, pivoted at 298 and connected by a link 299 with a bell crank lever 300 pivoted to the frame. The long arm of lever 300 has a pivotal connection with a rack bar 301 which engages with a pinion 302 secured to a ring or sleeve 303 loosely mounted on the end of the helix shaft 275. The sleeve 303 has a notch in its periphery with which engages a pawl 304 pivoted to a disk 305 fast to the helix shaft. Mounted on the said shaft is a two armed lever 306 carrying pins 307 against which the rack bar 301 slides and which keep such bar in engagement with the pinion 302.

By each revolution of the cam shaft 10 the rack bar 301 is forced forward and imparts one revolution to the helix shaft 275 and on the return movement of the said bar the pawl 304 rides over the disk 303, while the disk 305 is locked by a pawl 308. As the helix shaft rotates all of the disks or leaves 275 therein move with it, but they do nothing unless one or more of the gear wheels has been moved to throw the carrying lever 270 into the position in which it brings the racks 255 in engagement with the cam points on said leaves.

It will be recalled that in describing the operation of the setting rods 171 and the levers 174, Fig. 4, it was pointed out that those levers 174 which were not set for operation would fall with their connected bars 149 down to the bar 254, and would there remain. The following means are used to raise them to their normal positions. To the drive shaft 10, Fig. 50, is fixed a disk 284 with a cam groove in one side with which engages a pin on a bell crank lever 285, pivoted at 286. The free end of the bell crank carries a roller or stop 287 upon which lies a bar 288 having a depression or notch in one edge in which the pin 287 normally lies, so that when the bell crank is rocked by the cam 284 the bar 288 is reciprocated. The bar 288 is pivoted to an arm 289 fixed to a shaft 290 which has two arms 291 secured to it which carry a transverse bar 292, and when the bar 288 is shifted this bar 292 is swung upward carrying with it all of the levers 174 that may have dropped on to the bar 254.

The bar 288, however, is connected by a link 293, pivotally connected with the end of the lever 204 which is depressed and locked by the lever 205, while the cam shaft 10 is at rest and not operating, and it is while lever 204 is in this position that the bar 288 is held down so as to be engaged by the swinging of the bell crank lever 285. When, however, the lever 204 is raised, the bar 288 is lifted so that its end no longer lies in the path of the stop 287, and it is not shifted. This means that while the cam shaft 10 is operating the levers 174 which have dropped are not raised or reset, as there is no occasion for their being so.

Referring now to Fig. 58. On the clearing shaft 11 is a disk 309 with a cam groove in its face with which engages a pin on a lever 310 pivoted at 311 which connects by a link 312 with a bell crank lever 313, which, in turn, is connected with a rod 320 connected to two levers 314 pivoted at 315 by a long bar 316. To levers 314 are fixed arms 317 which by the rotation of the shaft 11 and the action of the connection to said lever are swung through the arc of a circle from the position in which they are shown, with their ends immediately over one of the pins 269 in the gear wheel 241, to that in which they strike the next pin 269 to the left, set in the side of such wheels. There are as many arms 317 as there are wheels 141, and they are caused to move with lever 314 by a rod 319 which passes through said levers and the arms.

If a wheel 141 has not moved, the arms 317 do not engage with any pins 269, but should a wheel be advanced, then an arm 317 when swung as described, strikes a pin on such wheel and moves it and the wheel to which it is attached through an arc the length of which is determined by the number of teeth through which the wheel must be turned in order to bring it to the zero position. In this way, whenever the clearing shaft 11 is rotated the gear wheels 141 will always be reset in zero position.

I have now described all portions of the machine which it is intended to include in the present application, and these comprise all parts of the mechanical tabulator with the exception of those which are concerned with the printing of records from the type-wheels. I may by the way of explanation state that the type-wheels, as contemplated in the complete machine, are indicated in Figs. 1 and 3 by the numerals 321. They are designed to be set by gear wheels 322, intermediate to them and the gear wheels 141, and in connection with them I have shown printing mechanisms 323. The type wheels and the printing mechanisms may be set in any proper or desired positions and are intended to print individual items, sub-totals and totals, as is customary in machines of this class. The mechanism for accomplishing this, is not shown in the present case, as it will be made subject of later applications, but it is manifest that it may be of any known character and operated from the drive, the cam or the clearing shafts by suitable cams or otherwise, in any manner understood in this art.

So also to avoid greater complexity than the nature of the case has required, I have omitted from the description and illustrations the carriage and means for feeding and manipulating the paper sheet or strip upon which the records are taken, as these also are within the knowledge of those skilled in this art. In this connection it may also be pointed out that in the operation of this, as in other machines designed for the same purpose, means are or may be employed for disconnecting the intermediate gear wheels 322 from the wheels 141 to preserve sub-totals and the like on the type wheels when the gear wheels 141 are reset to zero position. All of the parts and attachments just referred to, however, form no part of the invention covered by the present application, and are shown only conventionally and not in detail.

What I now claim as my invention is:

1. In a tabulating machine, the combination of the following elements adapted by their operation to stop the machine upon the failure of a card to pass or by the passage of a different card through the machine, a reciprocating pin box, a plurality of spring actuated pins carried thereby, means for setting certain of such pins in operative condition as controlling pins, means for locking such of said pins as encountered the body of a card in their first forward movement, in the position in the pin box to which they have thereby been moved, means for thereafter momentarily unlocking said pins from the pin box at the time when their ends, by the reciprocation of the pin box, reach the plane of a card as it passes through the machine, and means controlled by the forward movement in the pin box of any one or more pins thus unlocked as may not at that moment be stopped by the card for operating mechanism which disconnects and stops the operative parts of the machine.

2. In a tabulating machine, the combination of the following elements adapted by their operation to stop the machine upon the failure of a card to pass or by the passage of a different card through the machine, a reciprocating pin box, a plurality of spring actuated control pins carried thereby, means for locking against forward movement with respect to the pin box such control pins as are not intended to pass through perforations at predetermined points in a card, means for momentarily unlocking such pins when by the forward movement of the pin box their ends are brought to the plane of a card passing through the machine, and means controlled by the forward movement of any one or more pins which may not be stopped by the body of a card at such movement, to operate mechanism which stops the machine.

3. In a tabulating machine, the combination of a reciprocating pin box, a plurality of spring actuated pins carried thereby, certain of which are adapted to be set in operative condition as control pins, some of which by passing through perforations at predetermined points in a card permit the machine to operate, and others of which are normally locked in retracted position in the box so as not to be capable of a movement which carries them beyond the plane of a card, means for momentarily unlocking such pins at the point in their travel where they should normally touch a card and means operated by the movement of such pins relatively to the pin box which are not stopped by encountering the body of card for stopping the machine.

4. In a tabulating machine, the combination with a drive shaft and a gear wheel rotated thereby, of a machine operating shaft a pawl connection between the same and the driven gear, a stop adapted to be shifted to position to engage and release the pawl from the said operating shaft, a reciprocating pin box, a plurality of control pins carried thereby, some of which are normally set or adjusted to pass through perforations at predetermined points in cards passing through the machine, and means controlled by the passage of any other or others of said control pins across the plane of the cards to shift said stop, release the pawl and stop the machine.

5. In a tabulating machine, the combination of a reciprocating pin box, a plurality of spring actuated longitudinally movable pins carried thereby, pivoted plates having cam projections thereon which are adapted to be engaged by the pins so that said plates are swung laterally about their pivotal points by the forward and back movements of the pins with relation thereto, means controlled by the pivotal plates for maintaining a connection between the operative parts of the machine and the driving mechanism, whereby the movement of any one or more pins with reference to said pivoted plates swings the latter and operates said retaining mechanism to disconnect the machine from the driving mechanism.

6. In a mechanical tabulating machine, the combination with a reciprocating pin box, a plurality of spring actuated pins carried thereby adapted to be brought up to perforated cards passing through the machine and to pass through perforations in such cards when in line therewith, rack bars arranged in line with columns of said pins and adapted to be controlled in their movements by pins which project through the cards, other rack bars for controlling type wheels connected with and adapted to be set by the movements thereof, shafts between the two sets of rack bars and pinions movable longitudinally thereon and turning therewith and adapted to be adjusted to gear with the respective rack bars, whereby any pin controlled rack bar may be geared to any type wheel controlling rack bar.

7. In a mechanical tabulating machine, the combination of a reciprocating pin box, a plurality of spring actuated pins carried thereby adapted to be brought up to perforated cards passing through the machine and to pass through perforations in such cards when in line therewith, a series of rack bars, means for moving the same relatively to the pin box through distances determined by the pin that may project through a card into the line of travel of a part of said bars, other rack bars for controlling type wheels adapted to be moved by the pin controlled bar, wheels adapted to be set by the movements thereof, and means for throwing any pin controlled rack bar into gear with any type wheel controlling rack bar.

8. In a mechanical tabulating machine, the combination of a reciprocating pin box, pins carried thereby and adapted to pass through properly located perforations in a series of cards, two sets of rack bars, one set movable through distances determined by the pins that may project through the cards and engage said bars, the second set adapted to be moved by the first, type wheels set by the second set of rack bars, a frame with movable side bars supporting the two sets of rack bars, shafts extending between the rack bars, pinions longitudinally adjustable on said shafts whereby any rack bar of one set may be put in gear with any rack bar of the second set, and means for moving the sides of the frame apart to permit of the free movement of adjustment of said pinions on their shafts.

9. In a tabulating machine, the combination of a reciprocating pin box and pins carried thereby, a series of rack bars which are adapted to be moved through distances determined by the location of such pins as may pass through perforations in a series of cards passed through the machine, a second series of rack bars, type wheels set or adjusted thereby and means for throwing any pin controlled rack bar into gear with any type-wheel controlling rack bar.

10. In a mechanical tabulating machine, the combination of a reciprocating pin box and pins carried thereby, rack bars which are movable through distances determined by the pins which may project through perforations in a series of cards passed through the machine, a zero bar above the pin box with which the rack bars normally engage and by which they are locked against movement, the engaging portion of such rack bars being so formed as not to be encountered by a zero pin when passing through a card but adapted to be thrown out of engagement with the zero bar by any other pin.

11. In a mechanical tabulating machine, the combination with drive mechanism, of a shaft for operating the tabulating mechanism, a shaft for operating such parts as the clearing and total printing mechanisms, independently controlled connections between the drive shaft and the said two operating shafts and means for establishing such connection with the clearing and total printing shaft when the other operating shaft is disconnected, and means controlled by the drive shaft for permitting one rotation of the same before establishing connection with the clearing and totaling shaft, and the other operating shaft.

12. In a tabulating machine, the combination with a series of members under the control of punched card controlled mechanism and adapted to be moved through spaces which differ in extent in accordance with the position of perforations in the cards, of a series of type-wheel controlling members adapted to be moved by and proportionately to the movements of said first named members, and means for connecting any one of said first named members with any one of said second members.

13. The combination with the two series of parallel rack bars, one controlled by the pin mechanism of the tabulating machine, the other controlling the type wheels of said machine, of means for throwing any rack bar of the first named series into gear with any rack bar of the second series, and means for separating the two series of rack bars without disturbing their parallelism so as to permit of the introduction between them of such means.

14. In a mechanical tabulating machine, the combination with a drive shaft, of two shafts for operating different parts of the tabulating mechanism, gear wheels rotated by the drive shaft, ratchet disks on the said operating shafts, pawls rotating with the said gear wheel projections from said pawls, and stops adapted to be thrown into the path of said projections whereby either of said pawls may be thrown out of engagement with their ratchet disk and the shaft controlled thereby thrown out of operation.

15. The combination in and with a reciprocating pin box for tabulators, of spring actuated pins having cams thereon, and pivoted plates having cam surfaces thereon, means for raising all of said plates so that the cam surfaces are not in the planes of movement of the cam surfaces on the pins, means for depressing such of the plates as coöperate with those columns of pins which it is desired to set as control pins, whereby the cam surfaces are brought into line so that a forward or backward movement of the pins will effect a sidewise swinging movement of the plates and means controlled or actuated by such movement to stop the operation of the machine.

16. In a mechanical tabulating machine, the combination with a bank of reciprocating pins adapted to pass through perforations in a series of cards passed through the machine, of a series of rack bars, means for moving the same in the planes of the columns of pins whereby each of said bars will be moved until they encounter a projecting pin, and means for connecting such rack bars as it may be desired to operate with their moving mechanism, whereby such bars only will be moved during the operation of the machine.

17. In a mechanical tabulating machine, the combination with a bank of pins adapted to pass through perforations in a series of cards passed through the machine, of rack bars for setting the type-wheels, vertically movable bars for raising and lowering said bars, levers pivoted to the rack bars and adapted to travel in the planes of the columns of pins and to engage with projecting pins, and latches connecting said rack bars with the vertically moving bars operated to disconnect the same when the levers encounter a pin and are thereby brought to rest.

18. In a mechanical tabulating machine, the combination with pin controlled rack bars and type-wheel controlling rack bars adapted to move through distances proportional to those through which the pin controlled rack bars are moved, shafts extending between said rack bars, pinions longitudinally movable on and rotating with said shafts, rods sliding through said shafts and connected with said pinions, and index plates over which said bars are moved and to which they may be locked in properly indicated positions to bring any pinion into gear with any rack bar.

19. In a mechanical tabulating machine, the combination with a bank of pins, of rack bars adapted to be moved in the planes of the columns of said pins through distances determined by the position of such pins as project through the cards so as to be engaged by the rack bars, of means for bringing into operative condition such rack bars as may be desired, so that the others drop without action, and means operated by the drive shaft to restore such inoperative bars to normal or raised position, controlled by means operative only when the machine is disconnected from the drive shaft and comes to rest.

20. In a mechanical tabulating machine, the combination with a pin box having a series of control pins therein adapted to be brought into operative condition to perform their allotted functions by being depressed, of a plate secured to the machine adapted to receive one of the cards used for operating the machine and having a series of notches corresponding in position to the columns of figures or points for holes in the card, a sliding rotary bar having at one end an arm which when the bar is turned depresses one of the control pins, and at the other an arm which is turned to engage with that notch in the plate that corresponds to the column in the card by which it is desired to exercise control.

21. In a mechanical tabulating machine, the combination with rack bars adapted to be moved through distances determined by the pins that project through perforations in the cards used for operating the machine, of type-wheel controlling gear wheels, racks pivoted to the said rack bars, means operated by a moving part of the machine for throwing said racks into engagement with the said gear wheels, locking and carrying racks and means for throwing them into engagement with the gear wheels when the other operating racks are withdrawn, and independent means for withdrawing the locking racks form such engagement for resetting said gear wheels at the time when the operating racks may also be disengaged.

In testimony whereof I hereunto affix my signature.

AUGUST KNISTROM.